United States Patent
Ordentlich et al.

(10) Patent No.: US 8,085,888 B2
(45) Date of Patent: Dec. 27, 2011

(54) METHOD AND SYSTEM FOR DETERMINING AN OPTIMAL OR NEAR OPTIMAL SET OF CONTEXTS BY CONSTRUCTING A MULTI-DIRECTIONAL CONTEXT TREE

(75) Inventors: Erik Ordentlich, San Jose, CA (US); Marcelo J. Weinberger, San Jose, CA (US); Itschak Weissman, Menlo Park, CA (US); Gadiel Seroussi, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1469 days.

(21) Appl. No.: 11/580,453

(22) Filed: Oct. 13, 2006

(65) Prior Publication Data
US 2007/0096959 A1    May 3, 2007

Related U.S. Application Data

(62) Division of application No. 11/192,559, filed on Jul. 29, 2005, now Pat. No. 7,123,172.

(51) Int. Cl.
*H03D 1/04* (2006.01)
(52) U.S. Cl. ........ 375/346; 375/285; 375/278; 375/296; 375/254
(58) Field of Classification Search .................. 375/346, 375/285, 278, 296, 254
See application file for complete search history.

(56) References Cited

U.S. PATENT DOCUMENTS

2003/0163260 A1 *   8/2003   Moerig et al. .................. 702/14
2006/0153301 A1 *   7/2006   Guleryuz ................. 375/240.16

OTHER PUBLICATIONS

Chang et al., Spatially Adaptive Wavelet Thresholding with Context Modeling for Image Denoising, Sep. 2000, IEEE, vol. 9, pp. 1522-1531.*

* cited by examiner

*Primary Examiner* — Kabir A Timory

(57) ABSTRACT

In various embodiments of the present invention, optimal or near-optimal multidirectional context sets for a particular data-and/or-signal analysis or processing task are determined by selecting a maximum context size, generating a set of leaf nodes corresponding to those maximally sized contexts that occur in the data or signal to be processed or analyzed, and then building up and concurrently pruning, level by level, a multidirectional optimal context tree constructing one of potentially many optimal or near-optimal context trees in which leaf nodes represent the context of a near-optimal or optimal context set that may contain contexts of different sizes and geometries. Pruning is carried out using a problem-domain-related weighting function applicable to nodes and subtrees within the context tree. In one described embodiment, a bi-directional context tree suitable for a signal denoising application is constructed using, as the weighting function, an estimated loss function.

8 Claims, 32 Drawing Sheets

$$\Pi = \begin{bmatrix} P_{a_1} \to_{a_1} & P_{a_1} \to_{a_2} & P_{a_1} \to_{a_3} & \cdots & P_{a_1} \to_{a_n} \\ P_{a_2} \to_{a_1} & P_{a_2} \to_{a_2} & P_{a_2} \to_{a_3} & \cdots & P_{a_2} \to_{a_n} \\ P_{a_3} \to_{a_1} & P_{a_3} \to_{a_2} & P_{a_3} \to_{a_3} & \cdots & P_{a_3} \to_{a_n} \\ \vdots & \vdots & \vdots & & \vdots \\ P_{a_n} \to_{a_1} & P_{a_n} \to_{a_2} & P_{a_n} \to_{a_3} & \cdots & P_{a_n} \to_{a_n} \end{bmatrix} \begin{matrix} \pi_1 & \pi_2 & \pi_3 & \cdots & \pi_n \end{matrix}$$

with columns labeled $\pi_1, \pi_2, \pi_3, \cdots, \pi_n$ and matrix labeled 216

*Figure 2C*

218 → $[m^{clear}_{[a_1]}, m^{clear}_{[a_2]}, \ldots, m^{clear}_{[a_n]}]$

×

$\begin{bmatrix} P_{a_1 \to a_1}, P_{a_1 \to a_2}, \ldots, P_{a_1 \to a_n} \\ P_{a_2 \to a_1}, P_{a_2 \to a_2}, \ldots, P_{a_2 \to a_n} \\ \vdots \\ P_{a_n \to a_1}, P_{a_n \to a_2}, \ldots, P_{a_n \to a_n} \end{bmatrix}$

=

222 → $[m^{noisy}_{[a_1]}, m^{noisy}_{[a_2]}, \ldots, m^{noisy}_{[a_n]}]$ $m^{clear}_{[a_1]} P_{a_1 \to a_1} + m^{clear}_{[a_2]} P_{a_2 \to a_1} + m^{clear}_{[a_3]} P_{a_3 \to a_1}, \ldots, + m^{clear}_{[a_n]} P_{a_n \to a_1} = m^{noisy}_{[a_1]}$ $m^{clear}_{[a_1]} P_{a_1 \to a_2} + m^{clear}_{[a_2]} P_{a_2 \to a_2} + \hat{m}^{clear}_{[a_3]} P_{a_3 \to a_2}, \ldots, + m^{clear}_{[a_n]} P_{a_n \to a_2} = m^{noisy}_{[a_2]}$ $\ldots$ $m^{clear}_{[a_1]} P_{a_1 \to a_n} + m^{clear}_{[a_2]} P_{a_2 \to a_n} + m^{clear}_{[a_3]} P_{a_3 \to a_n}, \ldots, + m^{clear}_{[a_n]} P_{a_n \to a_n} = m^{noisy}_{[a_n]}$

*Figure 2D*

| 0 | 0 | 255 | 255 | 125 | 0 | 0 |
|---|---|---|---|---|---|---|
| 0 | 0 | 255 | 0 | 255 | 0 | 0 |
| 0 | 0 | 255 | 0 | 255 | 0 | 0 |
| 0 | 0 | 255 | 255 | 125 | 0 | 0 |
| 0 | 0 | 255 | 0 | 0 | 0 | 0 |
| 0 | 0 | 255 | 0 | 0 | 0 | 0 |
| 0 | 0 | 255 | 0 | 0 | 0 | 0 |

502

504

$$\begin{array}{cccccc}
\lambda_1 & \lambda_2 & \lambda_3 & & \lambda_n \\
\end{array}$$

$$\begin{bmatrix}
d_{a_1 \rightarrow a_1} & d_{a_1 \rightarrow a_2} & d_{a_1 \rightarrow a_3} & \cdots & d_{a_1 \rightarrow a_n} \\
d_{a_2 \rightarrow a_1} & d_{a_2 \rightarrow a_2} & d_{a_2 \rightarrow a_3} & \cdots & d_{a_2 \rightarrow a_n} \\
d_{a_3 \rightarrow a_1} & d_{a_3 \rightarrow a_2} & d_{a_3 \rightarrow a_3} & \cdots & d_{a_3 \rightarrow a_n} \\
\vdots & \vdots & \vdots & & \vdots \\
d_{a_n \rightarrow a_1} & d_{a_n \rightarrow a_2} & d_{a_n \rightarrow a_3} & \cdots & d_{a_n \rightarrow a_n}
\end{bmatrix}$$

$$\Lambda$$

*Figure 6*

$$\begin{bmatrix} d_{a_1 \to a_x} \\ d_{a_2 \to a_x} \\ \vdots \\ d_{a_n \to a_x} \end{bmatrix} \odot \begin{bmatrix} P_{a_1 \to a_\alpha} \\ P_{a_2 \to a_\alpha} \\ P_{a_3 \to a_\alpha} \\ \vdots \\ P_{a_n \to a_\alpha} \end{bmatrix} = \begin{bmatrix} d_{a_1 \to a_x} & P_{a_1 \to a_\alpha} \\ d_{a_2 \to a_x} & P_{a_2 \to a_\alpha} \\ d_{a_3 \to a_x} & P_{a_3 \to a_\alpha} \\ \vdots \\ d_{a_n \to a_x} & P_{a_n \to a_\alpha} \end{bmatrix}$$

$$\lambda_{a_x} \qquad \pi_{a_\alpha} \qquad \lambda_{a_x} \odot \pi_{a_\alpha}$$

*Figure 7*

$$q^T(S_{noisy}, S_{clear}, b, c) \times [\lambda_{a_x} \odot \pi_{a_\alpha}] = \text{distortion expected for replacing } a_\alpha \text{ in } ba_\alpha c \text{ in } S_{noisy} \text{ by } a_x$$

*Figure 8*

$$m^T(S_{noisy}, b, c) \quad \times \quad [\Pi^{-1}] \quad = \quad q^T(S_{noisy}, S_{clear}, b, c)$$

| 361 | 7 | 321 | 14 | 81 | 25 |

| 325 | 18 | 340 | 16 | 41 | 30 |

METHOD AND SYSTEM FOR DETERMINING AN OPTIMAL OR NEAR OPTIMAL SET OF CONTEXTS BY CONSTRUCTING A MULTI-DIRECTIONAL CONTEXT TREE

CROSS REFERENCE TO PARENT APPLICATION

This patent application claims priority as a divisional patent application of U.S. patent application Ser. No. 11/192,559 filed Jul. 29, 2005 entitled "Method and System for Determining an Optimal or Near Optimal Set of Contexts by Constructing a Multi-Dimensional Context Tree," having the same inventors and which will issue as U.S. Pat. No. 7,123,172 on Oct. 17, 2006.

TECHNICAL FIELD

The present invention is generally related to data-and-signal analysis, to data-and-signal processing, to more specific data-and-signal processing applications, including denoising, and, in particular, to a method and system for determining optimal or near-optimal context sets for context-based analysis and processing of signals and data.

BACKGROUND OF THE INVENTION

In many signal and data processing and analysis applications, each data unit, or symbol, in a one-dimensional, two-dimensional, or higher-dimensional sequence of symbols may be analyzed based on a local context, or neighborhood, of symbols temporally or spatially related to the currently considered symbol. Context-based analysis and processing of data and signals is particularly well suited to applications in which processing and analysis need to occur in real time, in which there are significant constraints on processing capacity and/or memory resources, or when information is lacking for more comprehensive analytical approaches based on global information. Denoising of signals received through a noisy channel is one well-studied example of an application in which context-based signal analysis may provide near-optimal efficiencies under the constraint that the originally transmitted, clean signal is not available following transmission.

Viewing a typical data-or-signal processing or analysis task as an operation carried out on an ordered sequence of symbols, such as numerical representations of bits or bytes, text characters, or other familiar symbols, a context-based approach involves considering each symbol within the symbol sequence with respect to its local neighborhood, or context, in order to potentially alter the symbol for some well-defined purpose. For example, in a denoising application, symbols in an ordered sequence of symbols received through a noisy channel may be altered, independently from one another, in order to remove noise introduced into the symbol sequence by the noisy channel. As another example, pixel values within an ordered sequence of pixel values representing an image may be altered in order to emphasize certain types of features, such as linear intensity edges, during an image filtering operation. In many cases, a fixed-size context, or neighborhood, about each symbol is employed in context-based analysis, and often the fixed size is chosen somewhat arbitrarily. Study of context-based analysis and processing has revealed that the efficiencies and/or accuracy of context-based processing and analysis may be optimized by optimizing the size and geometry of the contexts employed in the analysis and processing. In many cases, optimal or near-optimal results are obtained when the context size and geometry are not fixed throughout the analysis or processing task, but may vary in time or with respect to the position of the currently considered symbol within the ordered symbol sequence.

Unfortunately, optimizing an analysis or processing task with respect to context size and geometry may itself be a computationally expensive and conceptually difficult task. Therefore, information theorists, researchers and developers of a wide variety of signal-and/or-data processing and analysis methods and systems, and, ultimately, manufacturers, vendors, and users of such systems, have recognized the need for more efficient and accurate data-and/or-signal processing and analysis using context-based methods with optimal or near-optimal context sets.

SUMMARY OF THE INVENTION

In various embodiments of the present invention, optimal or near-optimal multidirectional context sets for a particular data-and/or-signal analysis or processing task are determined by selecting a maximum context size, generating a set of leaf nodes corresponding to those maximally sized contexts that occur in the data or signal to be processed or analyzed, and then constructing and concurrently pruning, level by level, a multidirectional context tree. The constructed context tree is one of potentially many optimal or near-optimal context trees in which leaf nodes represent the context of a near-optimal or optimal context set that may contain contexts of different sizes and geometries. Pruning is carried out using a problem-domain-related weighting function applicable to nodes and subtrees within the context tree. In one described embodiment, a bi-directional context tree suitable for a signal denoising application is constructed using, as the weighting function, an estimated loss function. In another embodiment of the present invention, the estimated loss function is employed to select a best denoiser for a particular problem from among a number of denoisers. In yet another embodiment of the present invention, construction of a bi-directional context tree and independent application of the loss estimator function are both employed to select a best denoiser for a particular problem from among a number of denoisers.

BRIEF DESCRIPTION OF THE DRAWINGS

FIGS. 2A-D illustrate a motivation for a discrete denoiser related to characteristics of the noise-introducing channel.

FIG. 6 displays one form of the symbol-transformation distortion matrix $\Lambda$.

FIG. 7 illustrates computation of the relative distortion expected from replacing a symbol "$a_a$" in a received, noisy signal by the symbol "$a_x$."

FIG. 8 illustrates use of the column vector $\lambda_{a_x} \odot \pi_{a_a}$ to compute a distortion expected for replacing the center symbol $a_a$ in the metasymbol $ba_ac$ in a noisy signal "$s_{noisy}$" by the replacement symbol $a_x$.

FIG. 9 shows estimation of the counts of the occurrences of symbols "$a_1$"-"$a_n$" for the clean signal.

FIG. 16A-K illustrate construction of a simple bi-directional context tree based on the binary alphabet {0,1} and k=1 by the method embodied in the routine "optimumCTree."

DETAILED DESCRIPTION OF THE INVENTION

The present invention concerns methods and systems for determining optimal and near-optimal multi-directional context trees suitable for context-based analysis and processing of data or signals within specified problem domains. The present invention is discussed, below, with reference to a denoising application. Therefore, in a first subsection, below, an extensive discussion of denoising methods is first provided. Then, in a following subsections, an embodiment of the present invention suitable for denoising applications is provided, with reference to figures, to high-level pseudocode, to lower-level, C++-like pseudocode, and to both textual and mathematical descriptions.

DUDE

Figure 1:
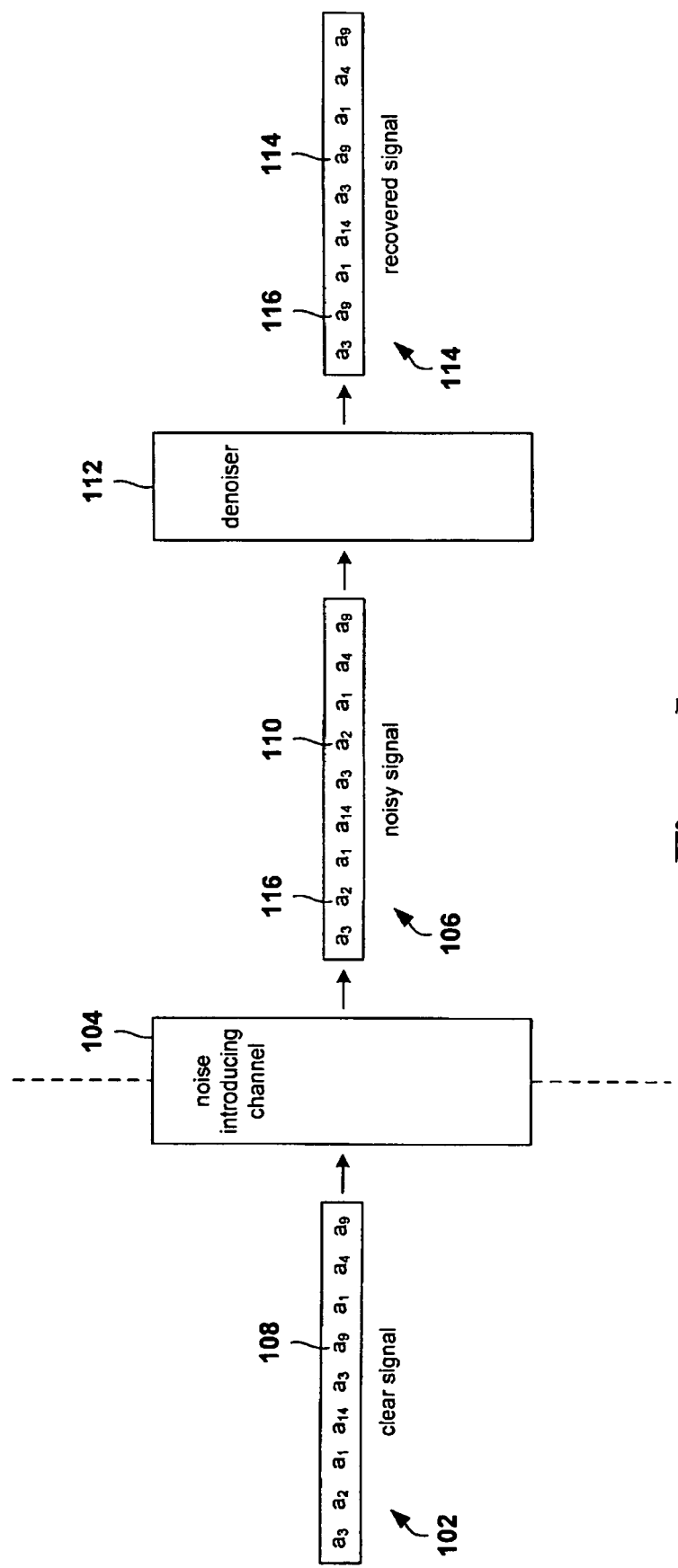
FIG. 1 illustrates introduction of noise into a clean signal to produce a noisy signal and subsequent denoising of the noisy signal to produce a recovered signal.

FIG. 1 illustrates introduction of noise into a clean signal to produce a noisy signal and subsequent denoising of the noisy signal to produce a recovered signal. In FIG. 1, signals are represented as sequences of symbols that are each members of an alphabet A having n distinct symbols, where A is:

$$A=(a_1,a_2,a_3,\ldots a_n)$$

Note that the subscripts refer to the positions of the respective symbols within an ordered listing of the different symbols of the alphabet, and not to the positions of symbols in a signal. While symbol representations, such as symbol representations $a_1,a_2,a_3,\ldots a_n$ are generally italicized in the text, they may not be italicized in the figures. In FIG. 1, an initial, clean signal 102 comprises an ordered sequence of nine symbols from the alphabet A. In normal circumstances, an input signal would generally have thousands, millions, or more symbols. The short input signal 102 is used for illustrative convenience.

The clean signal 102 is transmitted or passed through a noise-introducing channel 104, producing a noisy signal 106. In the example shown in FIG. 1, the output signal 106 comprises symbols from the same alphabet as the input signal 102, although, in general, the input symbols may be chosen from a different, equally sized or smaller alphabet than that from which the output symbols are selected. In the example shown in FIG. 1, the sixth symbol in the clean signal 108, "$a_9$," is altered by the noise-introducing channel to produce the symbol "$a_2$" 110 in the noisy signal 106. There are many different types of noise-introducing channels, each type characterized by the types and magnitudes of noise that the noise-introducing channel introduces into a clean signal. Examples of noise-introducing channels include electronic communications media, data storage devices to which information is transferred and from which information is extracted, and transmission and reception of radio and television signals. In this discussion, a signal is treated as a linear, ordered sequence of symbols, such as a stream of alphanumeric characters that comprise a text file, but the actual data into which noise is introduced by noise-introducing channels in real world situations may include two-dimensional images, audio signals, video signals, and other types of displayed and broadcast information.

In order to display, broadcast, or store a received, noisy signal with reasonable fidelity with respect to the initially transmitted clean signal, a denoising process may be undertaken to remove noise introduced into the clean signal by a noise-introducing channel. In FIG. 1, the noisy signal 106 is passed through, or processed by, a denoiser 112 to produce a recovered signal 114 which, when the denoising process is effective, is substantially closer to, or more perceptually similar to, the originally transmitted clean signal than to the received noisy signal.

Many types of denoisers have been proposed, studied, and implemented. Some involve application of continuous mathematics, some involve detailed knowledge of the statistical properties of the originally transmitted clean signal, and some rely on detailed information concerning time and sequence-dependent behavior of the noise-introducing channel. The following discussion describes a discrete denoiser, referred to as "DUDE," related to the present invention.

The DUDE is discrete in the sense that the DUDE processes signals comprising discrete symbols using a discrete algorithm, rather than continuous mathematics. The DUDE is universal in that it asymptotically approaches the performance of an optimum denoiser employing knowledge of the clean-signal symbol-occurrence distributions without access to these distributions.

The DUDE implementation is motivated by a particular noise-introducing-channel model and a number of assumptions. These are discussed below. However, DUDE may effectively function when the model and assumptions do not, in fact, correspond to the particular characteristics and nature of a noise-introducing channel. Thus, the model and assumptions motivate the DUDE approach, but the DUDE has a much greater range of effectiveness and applicability than merely to denoising signals corrupted by a noise-introducing channel corresponding to the motivating model and assumptions.

As shown in FIG. 1, the DUDE 112 employs a particular strategy for denoising a noisy signal. The DUDE considers each symbol within a context generally comprising one or more symbols preceding and following the symbol according to a left to right ordering. For example, in FIG. 1, the two occurrences of the symbol "$a_2$" in the noisy signal 106 occur within the same single preceding-and-following-symbol context. The full context for the two occurrences of the symbol "$a_2$" in the noisy signal 106 of the example in FIG. 1 is ["$a_3$," "$a_1$"]. The DUDE either leaves all symbols of a particular type "$a_i$" within a particular context unchanged, or changes all occurrences of a particular type of symbol "$a_i$" within a particular context to a different symbol "$a_j$." For example, in FIG. 1, the denoiser has replaced all occurrences of the symbol "$a_2$" 110 and 112 in the noisy signal within the full context ["$a_3$," "$a_1$"] with the symbol "$a_9$" 114 and 116 in the recovered symbol. Thus, the DUDE does not necessarily produce a recovered signal identical to the originally transmitted clean signal, but instead produces a denoised, recovered signal estimated to have less distortion with respect to the clean signal than the noisy signal. In the above example, replacement of the second symbol "$a_2$" 110 with the symbol "$a_9$" 114 restores the originally transmitted symbol at that position, but replacement of the first occurrence of symbol "$a_2$" 112 in the noisy signal with the symbol "$a_9$" 116 introduces a new distortion. The DUDE only replaces one symbol with another to produce the recovered signal when the DUDE estimates that the overall distortion of the recovered signal with respect to the clean signal will be less than the distortion of the noisy signal with respect to the clean signal.

Figure 2A:
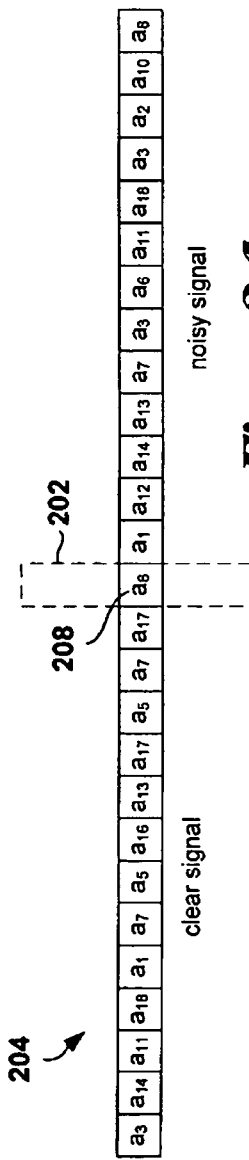

FIGS. 2A-D illustrate a motivation for DUDE related to characteristics of the noise-introducing channel. DUDE assumes a memory-less channel. In other words, as shown in FIG. 2A, the noise-introducing channel 202 may be considered to act as a one-symbol window, or aperture, through which a clean signal 204 passes. The noise-introducing channel 202 corrupts a given clean-signal symbol, replacing the given symbol with another symbol in the noisy signal, with an estimateable probability that depends neither on the history of symbols preceding the symbol through the noise-introducing channel nor on the symbols that are subsequently transmitted through the noise-introducing channel.

Figure 2B:
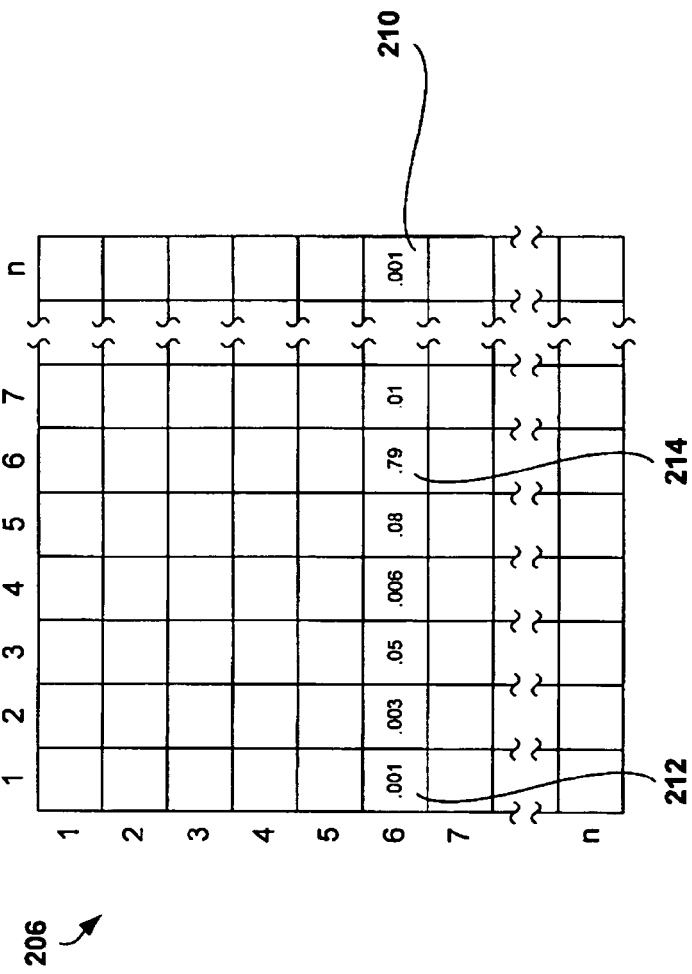

FIG. 2B shows a portion of a table 206 that stores the probabilities that any particular symbol from the alphabet A, "$a_i$," may be corrupted to a symbol "$a_j$" during transmission through the noise-introducing channel. For example, in FIG. 2A, the symbol "$a_6$" 208 is currently passing through the noise-introducing channel. Row 210 in table 206 contains the probabilities that symbol "$a_6$" will be corrupted to each of the different, possible symbols in the alphabet A. For example, the probability that the symbol "$a_6$" will be changed to the symbol "$a_1$" 212 appears in the first cell of row 210 in table 206, indexed by the integers "6" and "1" corresponding to the positions of symbols "$a_6$" and "$a_1$" in the alphabet A. The probability that symbol "$a_6$" will be faithfully transferred, without corruption, through the noise-introducing channel 214 appears in the table cell with indices (6, 6), the probability of symbol "$a_6$" being transmitted as the symbol "$a_6$." Note that the sum of the probabilities in each row of the table 206 is 1.0, since a given symbol will be transmitted by the noise-introducing channel either faithfully or it will be corrupted to some other symbol in alphabet A. As shown in FIG. 2C, table 206 in FIG. 2B can be alternatively expressed as a two-dimensional matrix $\Pi$ 216, with the matrix element identified by indices (i, j) indicating the probability that symbol "$a_i$" will be transmitted by the noise-introducing channel as symbol "$a_j$." Note also that a column j in matrix $\Pi$ may be referred to as "$\pi_j$" or $\pi_{a_j}$.

As shown in FIG. 2D, a row vector 218 containing the counts of the number of each type of symbol in the clean signal, where, for example, the number of occurrences of the symbol "$a_5$" in the clean signal appears in the row vector as $m^{clean}[a_5]$, can be multiplied by the symbol-transition-probability matrix $\Pi$ 220 to produce a row vector containing the expected counts for each of the symbols in the noisy signal. The actual occurrence counts of symbols "$a_i$" in the noisy signal appear in the row vector $m^{noisy}$. The matrix multiplication is shown in expanded form 224 below the matrix multiplication in FIG. 2D. Thus, in vector notation:

$$m^{clean}\Pi \cong m^{noisy}$$

where $m^{clean}$ is a row vector containing the occurrence counts of each symbol $a_i$ in alphabet A in the clean signal; and $m^{noisy}$ is a row vector containing the occurrence counts of each symbol $a_i$ in alphabet A in the noisy signal.

The approximation symbol $\cong$ is employed in the above equation, because the probabilities in the matrix $\Pi$ give only the expected frequency of a particular symbol substitution, while the actual symbol substitution effected by the noise-introducing channel is random. In other words, the noise-introducing channel behaves randomly, rather than deterministically, and thus may produce different results each time a particular clean signal is transmitted through the noise-introducing channel. The error in the approximation, obtained as the sum of the absolute values of the components of the difference between the left and right sides of the approximation, above, is generally small relative to the sequence length, on the order of the square root of the sequence length. Multiplying, from the right, both sides of the above equation by the inverse of matrix $\Pi$, assuming that $\Pi$ is invertible, allows for calculation of an estimated row-vector count of the symbols in the clean signal, $\hat{m}^{clean}$, from the counts of the symbols in the noisy signal, as follows:

$$\hat{m}^{clean} = m^{noisy}\Pi^{-1}$$

In the case where the noisy symbol alphabet is larger than the clean symbol alphabet, it is assumed that $\Pi$ is full-row-rank and the inverse in the above expression can be replaced by a generalized inverse, such as the Moore-Penrose generalized inverse.

As will be described below, the DUDE applies clean symbol count estimation on a per-context basis to obtain estimated counts of clean symbols occurring in particular noisy symbol contexts. The actual denoising of a noisy symbol is then determined from the noisy symbol's value, the resulting estimated context-dependent clean symbol counts, and a loss or distortion measure, in a manner described below.

As discussed above, the DUDE considers each symbol in a noisy signal within a context. The context may be, in a 1-dimensional signal, such as that used for the example of FIG. 1, the values of a number of symbols preceding, following, or both preceding and following a currently considered symbol. In 2-dimensional or higher dimensional signals, the context may be values of symbols in any of an almost limitless number of different types of neighborhoods surrounding a particular symbol. For example, in a 2-dimensional image, the context may be the eight pixel values surrounding a particular, interior pixel. In the following discussion, a 1 dimensional signal is used for examples, but higher dimensional signals can be effectively denoised by the DUDE.

Figure 3A:
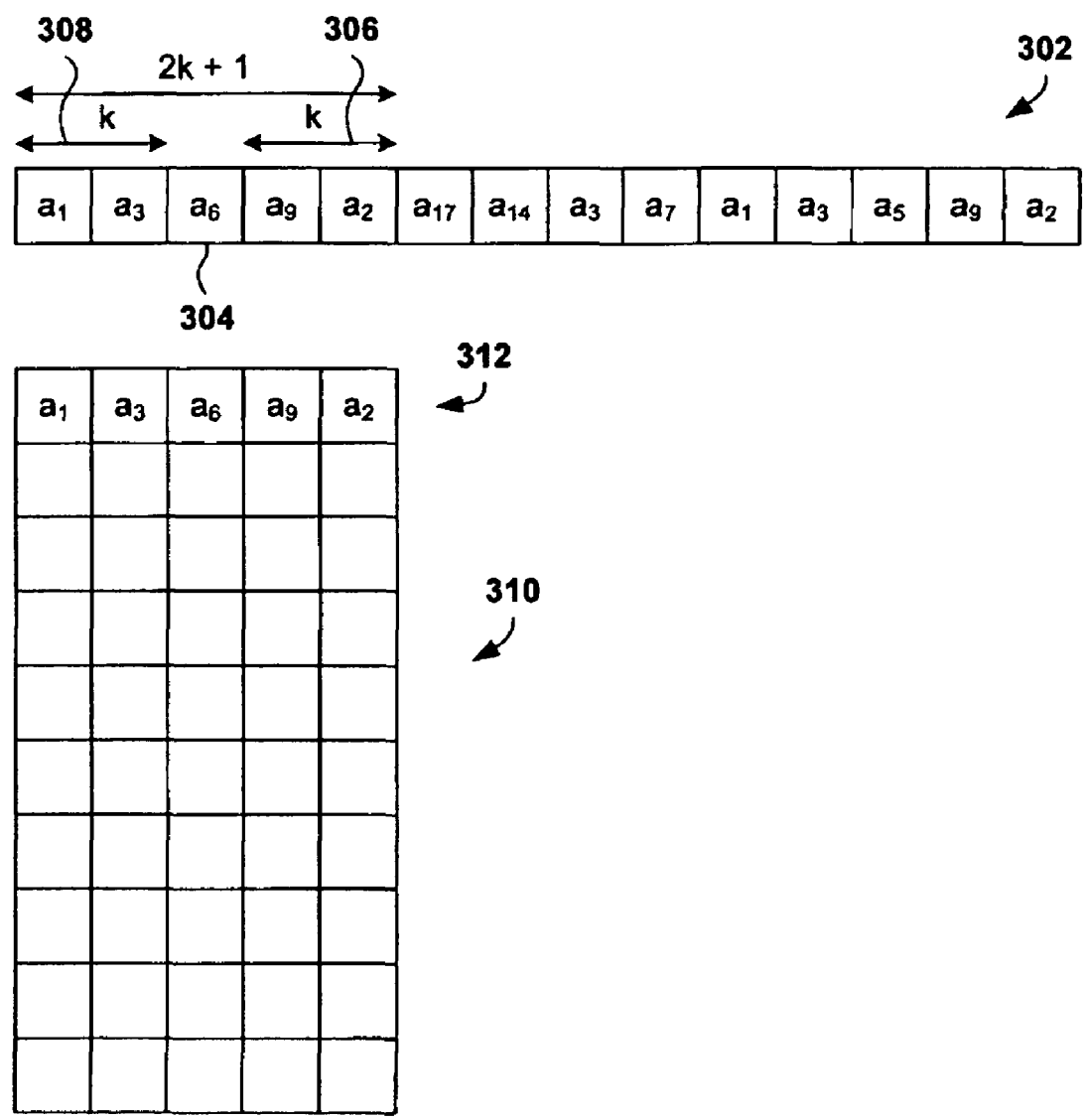
FIGS. 3A-D illustrate a context-based, sliding window approach by which a discrete denoiser characterizes the occurrences of symbols in a noisy signal.

In order to consider occurrences of symbols within contexts in the 1-dimensional-signal case, the DUDE needs to consider a number of symbols adjacent to each considered symbol. FIGS. 3A-D illustrate a context-based, sliding window approach by which the DUDE characterizes the occurrences of symbols in a noisy signal. FIGS. 3A-D all employ the same illustration conventions, which are described only for FIG. 3A, in the interest of brevity. In FIG. 3A, a noisy signal 302 is analyzed by DUDE in order to determine the occurrence counts of particular symbols within particular contexts within the noisy signal. The DUDE employs a constant k to describe the length of a sequence of symbols preceding, and the length of a sequence of symbols subsequent to, a particular symbol that, together with the particular symbol, may be viewed as a metasymbol of length 2k+1. In the example of FIGS. 3A-D, k has the value "2." Thus, a symbol preceded by a pair of symbols and succeeded by a pair of symbols can be viewed as a five-symbol metasymbol. In FIG. 3A, the symbol "$a_6$" 304 occurs within a context of the succeeding k-length symbol string "$a_9a_2$" 306 and is preceded by the two-symbol string "$a_1a_3$" 308. The symbol "$a_6$" therefore occurs at least once in the noisy signal within the context ["$a_1a_3$," "$a_9a_2$"], or, in other words, the metasymbol "$a_1a_3a_6a_9a_2$" occurs at least once in the noisy signal. The occurrence of this metasymbol within the noisy signal 302 is listed within a table 310 as the first five-symbol metacharacter 312.

Figure 3B:
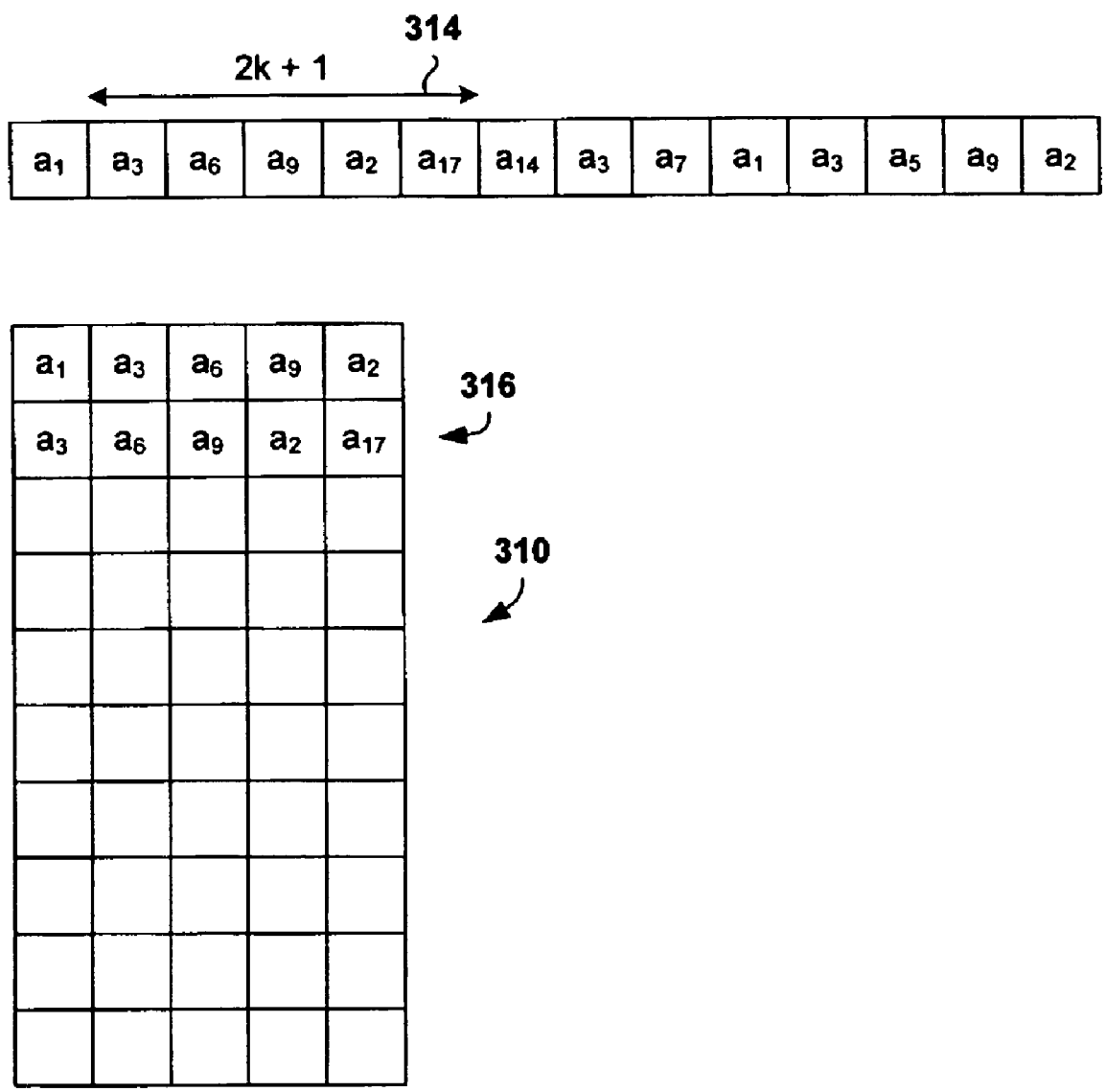
Figure 3C:
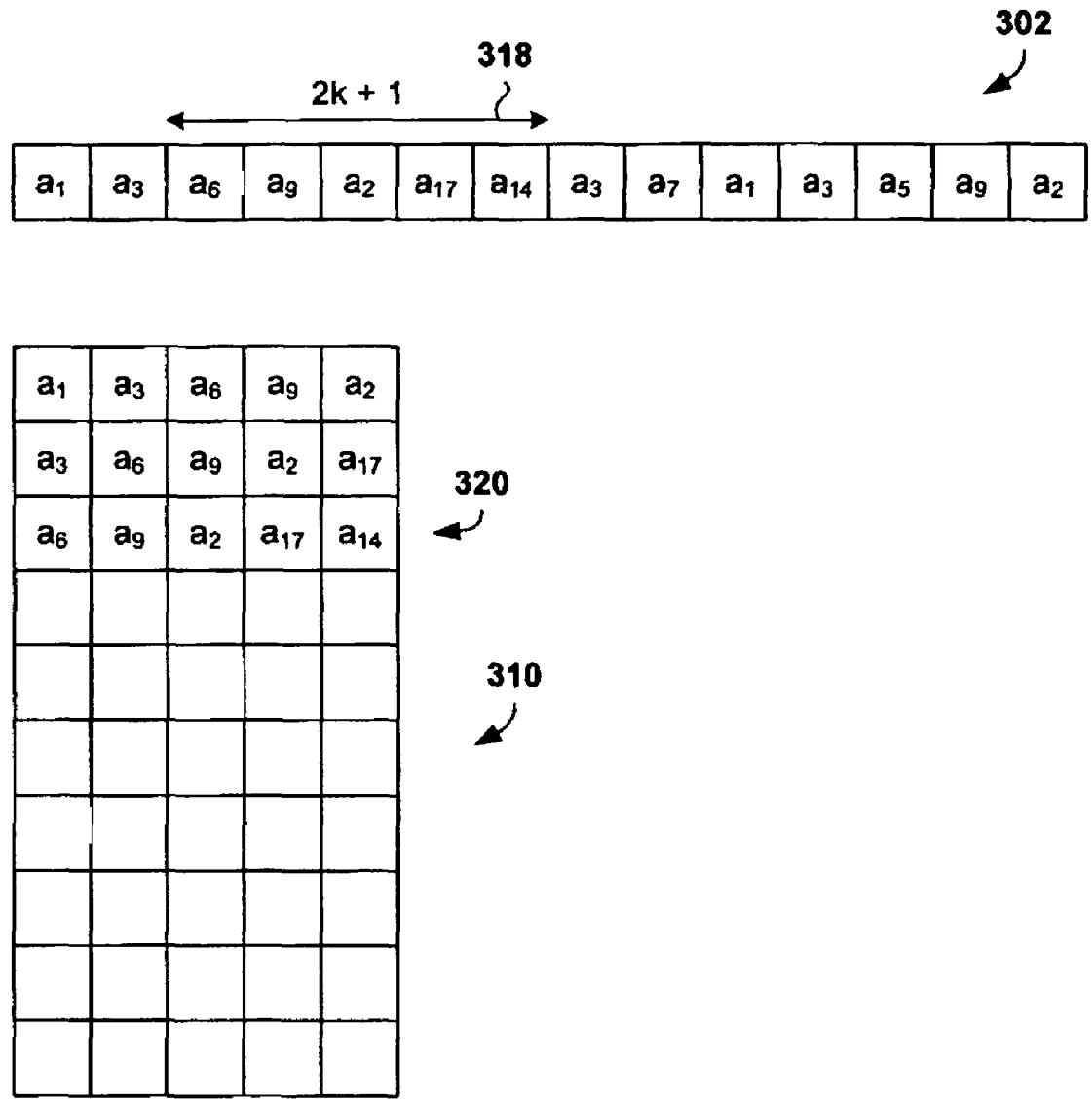
Figure 3D:
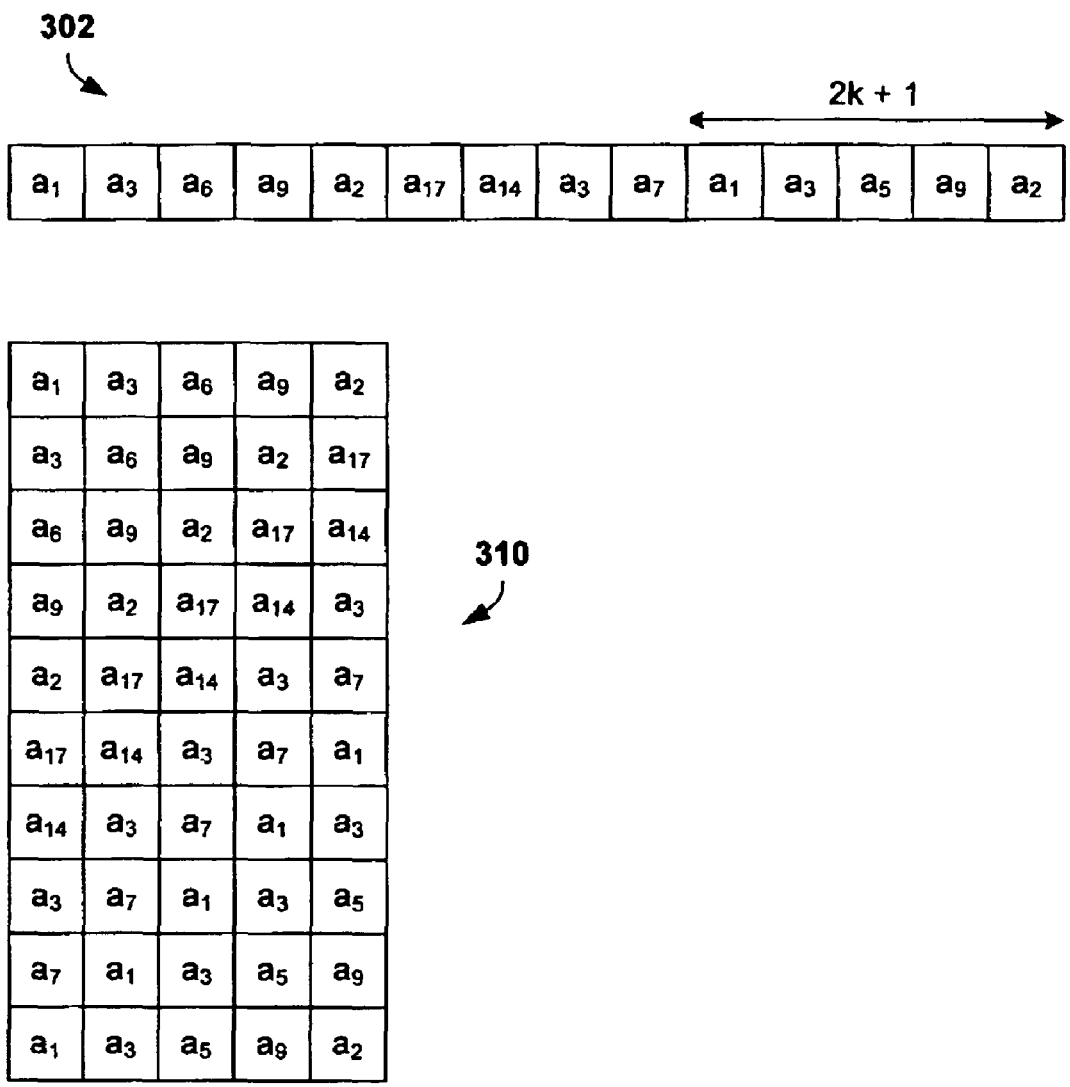

As shown in FIG. 3B, DUDE then slides the window of length 2k+1 rightward, by one symbol, to consider a second metasymbol 314 of length 2k+1. In this second metasymbol, the symbol "$a_9$" appears within the context ["$a_3a_6$," "$a_2a_{17}$"]. This second metasymbol is entered into table 310 as the second entry 316. FIG. 3C shows detection of a third metasymbol 318 in the noisy signal 302 and entry of the third metasymbol into table 310 as entry 320. FIG. 3D shows the table 310 following complete analysis of the short noisy signal 302 by DUDE. Although, in the examples shown in FIG. 3-D, DUDE lists each metasymbol as a separate entry in the table, in a more efficient implementation, DUDE enters each detected metasymbol only once in an index table, and increments an occurrence count each time the metasymbol is subsequently detected. In this fashion, in a first pass, DUDE tabulates the frequency of occurrence of metasymbols within the noisy signal or, viewed differently, DUDE tabulates the occurrence frequency of symbols within contexts comprising k preceding and k subsequent symbols surrounding each symbol.

Figure 4:
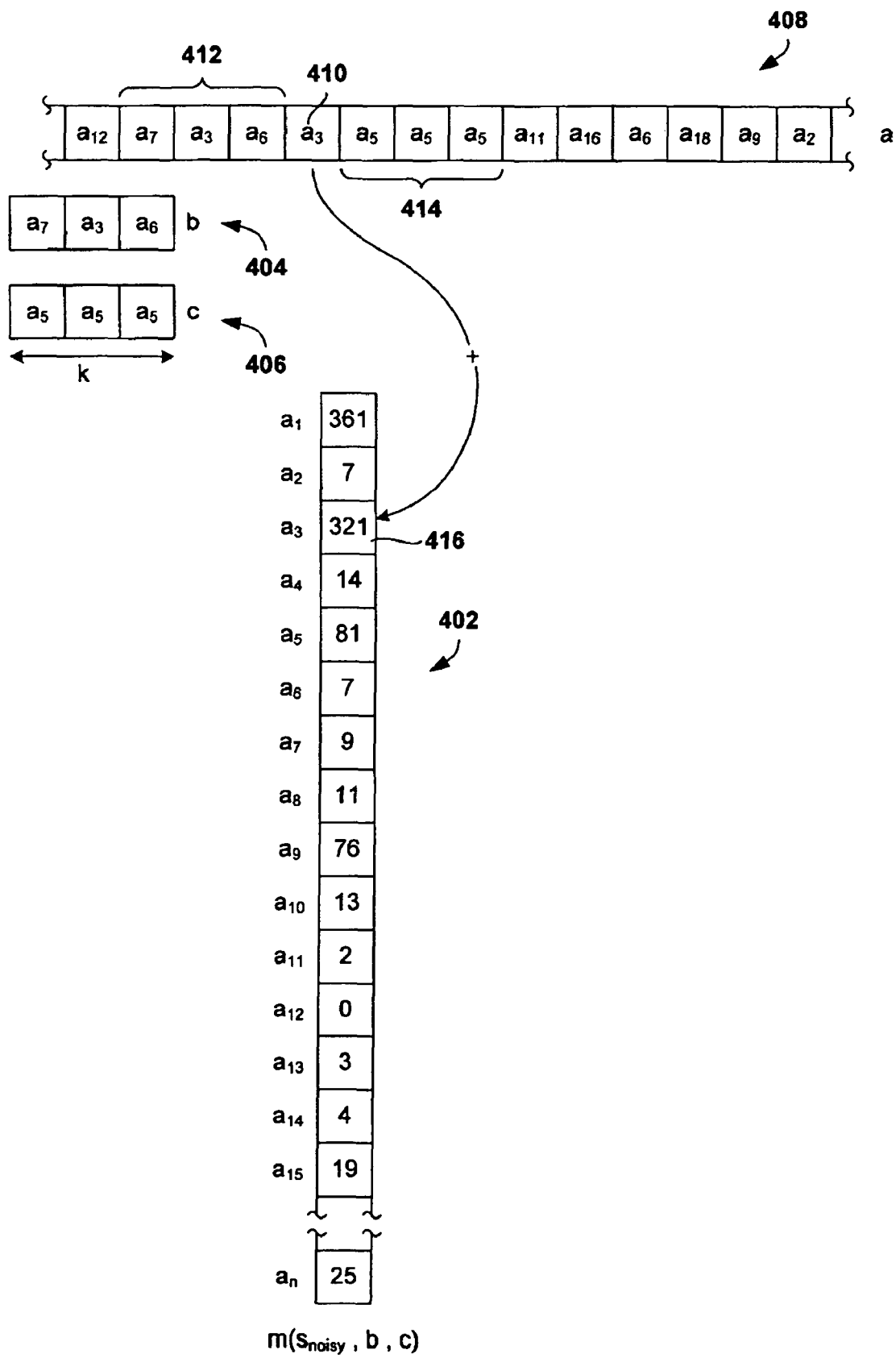
FIG. 4 illustrates a convenient mathematical notation and data structure representing a portion of the metasymbol table constructed by a discrete denoiser, as described with reference to FIGS. 3A-D.

FIG. 4 illustrates a convenient mathematical notation and data structure representing a portion of the metasymbol table constructed by DUDE, as described with reference to FIGS. 3A-D. The column vector $m(s_{noisy},b,c)$ 402 represents a count of the occurrences of each symbol in the alphabet A within a particular context, represented by the k-length symbol vectors b and c, within the noisy signal $s_{noisy}$, where the noisy signal is viewed as a vector. In FIG. 4, for example, the context value for which the occurrence counts are tabulated in column vector $m(s_{noisy},b,c)$ comprises the symbol vector 404 and the symbol vector 406, where k has the value 3. In the noisy signal $s_{noisy}$ 408, the symbol "$a_3$" 410 occurs within the context comprising three symbols 412 to the left of the symbol "$a_3$" 410 and three symbols 414 to the right of the symbol "$a_3$". This particular context has a value equal to the combined values of symbol vectors 404 and 406, denoted ["$a_7a_3a_6$," "$a_5a_5a_5$"] and this occurrence of the symbol "$a_3$" 410 within the context ["$a_7a_3a_6$," "$a_5a_5a_5$"], along with all other occurrences of the symbol "$a_3$" in the context ["$a_7a_3a_6$," "$a_5a_5a_5$"], is noted by a count 416 within the column vector $m(s_{noisy},b,c)$, with [b,c]=["$a_7a_3a_6$," "$a_5a_5a_5$"]. In other words, a symbol "$a_3$" occurs within the context ["$a_7a_3a_6$," "$a_5a_5a_5$"] in the noisy signal $s_{noisy}$ 321 times. The counts for the occurrences of all other symbols "$a_1$", "$a_2$", and "$a_4$"-"$a_n$" in the context ["$a_7a_3a_6$", "$a_5a_5a_5$"] within noisy signal $s_{noisy}$ are recorded in successive elements of the column vector $m(s_{noisy},$ "$a_7a_3a_6$", "$a_5a_5a_5$"). An individual count within a column vector $m(s_{noisy},b,c)$ can be referred to using an array-like notation. For example, the count of the number of times that the symbol "$a_3$" appears in the context ["$a_7a_3a_6$," "$a_5a_5a_5$"] within the noisy signal $s_{noisy}$, 321, can be referred to as $m(s_{noisy},$ "$a_7a_3a_6$", "$a_5a_5a_5$")[$a_3$].

DUDE employs either a full or a partial set of column vectors for all detected contexts of a fixed length 2k in the noisy signal in order to denoise the noisy signal. Note that an initial set of symbols at the beginning and end of the noisy signal of length k are not counted in any column vector $m(s_{noisy},b,c)$ because they lack either sufficient preceding or subsequent symbols to form a metasymbol of length 2k+1. However, as the length of the noisy signal for practical problems tends to be quite large, and the context length k tends to be relatively small, DUDE's failure to consider the first and final k symbols with respect to their occurrence within contexts makes almost no practical difference in the outcome of the denoising operation.

Figures 5A, 5B:
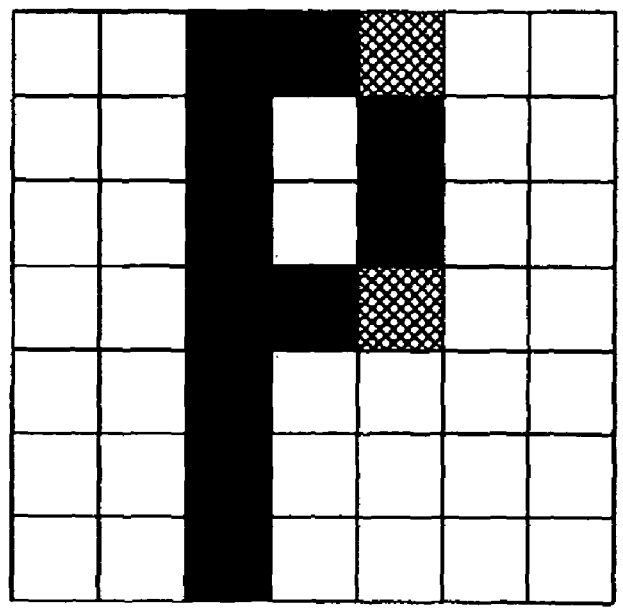
FIGS. 5A-D illustrate the concept of symbol-corruption-related distortion in a noisy or recovered signal.

FIGS. 5A-D illustrate the concept of symbol-corruption-related distortion in a noisy or recovered signal. The example of FIGS. 5A-D relates to a 256-value gray scale image of a letter. In FIG. 5A, the gray-scale values for cells, or pixels, within a two-dimensional image 502 are shown, with the character portions of the symbol generally having a maximum gray-scale value of 255 and the background pixels having a minimum gray-scale value of zero, using a convention that the displayed darkness of the pixel increases with increasing numerical value. Visual display of the image represented by the two-dimensional gray-scale signal in FIG. 5A is shown in FIG. 5B 504. The gray-scale data in FIG. 5A is meant to represent a low resolution image of the letter "P." As shown in FIG. 5B, the image of the letter "P" is reasonably distinct, with reasonably high contrast.

Figures 5C, 5D:
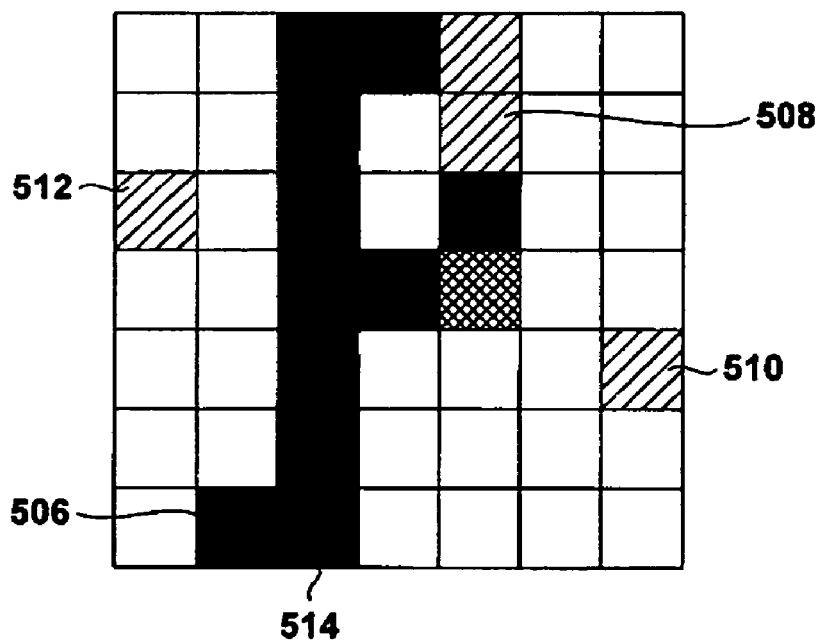

FIG. 5C shows the gray-scale data with noise introduced by transmission through a hypothetical noise-introducing channel. Comparison of FIG. 5C to FIG. 5A shows that there is marked difference between the gray-scale values of certain cells, such as cell 506, prior to, and after, transmission. FIG. 5D shows a display of the gray-scale data shown in FIG. 5C. The displayed image is no longer recognizable as the letter "P." In particular, two cells contribute greatly to the distortion of the figure: (1) cell 506, changed in transmission from the gray-scale value "0" to the gray-scale value "223"; and (2) cell 508, changed in transmission from the gray-scale value "255" to the gray-scale value "10." Other noise, such as the relatively small magnitude gray-scale changes of cells 510 and 512, introduce relatively little distortion, and, by themselves, would have not seriously impacted recognition of the letter "P." In this case, the distortion of the displayed image contributed by noise introduced into the gray-scale data appears to be proportional to the magnitude of change in the gray-scale value. Thus, the distorting effects of noise within symbols of a signal are not necessarily uniform. A noise-induced change of a transmitted symbol to a closely related, received symbol may produce far less distortion than a noise-induced change of a transmitted symbol to a very different, received symbol.

The DUDE models the non-uniform distortion effects of particular symbol transitions induced by noise with a matrix Λ. FIG. 6 displays one form of the symbol-transformation distortion matrix Λ. An element $d_{a_i \to a_j}$ of the matrix Λ provides the relative distortion incurred by substituting the symbol "$a_j$" in the noisy or recovered signal for the symbol "$a_i$" in the clean signal. An individual column j of the matrix Λ may be referred to as $\lambda_j$ or $\lambda_{a_j}$.

FIG. 7 illustrates computation of the relative distortion, with respect to the clean signal, expected from replacing a symbol "$a_a$" in a received, noisy signal by the symbol "$a_x$." As shown in FIG. 7, element-by-element multiplication of the elements of the column vectors $\lambda_{a_x}$ and $\pi_{a_a}$, an operation known as the Schur product of two vectors, and designated in the current discussion by the symbol ⊙, produces the column vector $\lambda_{a_x} \odot \pi_{a_a}$ in which the i-th element is the product of a distortion and probability, $d_{a_j \to a_x} p_{a_j \to a_a}$, reflective of the relative distortion expected in the recovered signal by replacing the symbol "$a_a$" in the noisy symbol by the symbol "$a_x$" when the symbol in the originally transmitted, clean signal is "$a_j$."

FIG. 8 illustrates use of the column vector $\lambda_{a_x} \odot \pi_{a_a}$ to compute a distortion expected for replacing "$a_a$" in the metasymbol ba$_a$c in a noisy signal $s_{noisy}$ by the replacement symbol "$a_x$". In the following expression, and in subsequent expressions, the vectors $s_{noisy}$ and $s_{clean}$ denote noisy and clean signals, respectively. A different column vector q can be defined to represent the occurrence counts for all symbols in the clean signal that appear at locations in the clean signal that correspond to locations in the noisy signal around which a particular context [b, c] occurs. An element of the column vector q is defined as:

$$q(s_{noisy}, s_{clean}, b, c)[a_a] = |\{i : s_{clean}[i] = a_a, (s_{noisy}[i-k], s_{noisy}[i-k+1], \ldots s_{noisy}[i-1]) = b, (s_{noisy}[i+1], s_{noisy}[i+2], \ldots, s_{noisy}[i+k]) = c\}|,$$

where $s_{clean}[i]$ and $s_{noisy}[i]$ denote the symbols at location i in the clean and noisy signals, respectively; and $a_a$ is a symbol in the alphabet A.

The column vector $q(s_{noisy}, s_{clean}, b, c)$ includes n elements with indices $a_a$ from "$a_1$" to "$a_n$," where n is the size of the symbol alphabet A. Note that the column vector $q(s_{noisy}, s_{clean}, b, c)$ is, in general, not obtainable, because the clean signal, upon which the definition depends, is unavailable. Multiplication of the transpose of the column vector $q(s_{noisy}, s_{clean}, b, c)$, $q^T(s_{noisy}, s_{clean}, b, c)$, by the column vector $\lambda_{a_x} \odot \pi_{a_a}$ produces the sum of the expected distortions in the column vector times the occurrence counts in the row vector that together provide a total expected distortion for replacing "$a_a$" in the metasymbol $ba_ac$ in $s_{noisy}$ by "$a_x$". For example, the first term in the sum is produced by multiplication of the first elements in the row vector by the first element in the column vector, resulting in the first term in the sum being equal to $q^T(s_{noisy}, s_{clean}, b, c)[a_1](p_{a_1 \to a_a} d_{a_1 \to a_x})$ or, in other words, a contribution to the total distortion expected for replacing "$a_a$" by "$a_x$" in all occurrences of $ba_ac$ in $s_{noisy}$ when the corresponding symbol in $s_{clean}$ is $a_1$. The full sum gives the full expected distortion:

$$q^T(s_{noisy}, s_{clean}, b, c)[a_1](p_{a_1 \to a_a} d_{a_1 \to a_x}) +$$
$$q^T(s_{noisy}, s_{clean}, b, c)[a_2](p_{a_2 \to a_a} d_{a_2 \to a_x}) +$$
$$q^T(s_{noisy}, s_{clean}, b, c)[a_3](p_{a_3 \to a_a} d_{a_3 \to a_x}) +$$
$$\vdots$$
$$q^T(s_{noisy}, s_{clean}, b, c)[a_n](p_{a_n \to a_a} d_{a_n \to a_x})$$

As discussed above, DUDE does not have the advantage of knowing the particular clean signal, transmitted through the noise-introducing channel that produced the received noisy signal. Therefore, DUDE estimates the occurrence counts, $q^T(s_{noisy}, s_{clean}, b, c)$, of symbols in the originally transmitted, clean signal, by multiplying the row vector $m^T(s_{noisy}, b, c)$ by $\Pi^{-1}$ from the right. FIG. 9 shows estimation of the counts of the occurrences of symbols "$a_1$"-"$a_n$" for the clean signal.

The resulting expression $$m^T(s_{noisy}, b, c)\Pi^{-1}(\lambda_{a_x} \odot \pi_{a_a})$$

obtained by substituting $m^T(s_{noisy}, b, c)\Pi^{-1}$ for $q^T(s_{noisy}, s_{clean}, b, c)$ represents DUDE's estimation of the distortion, with respect to the originally transmitted clean signal, produced by substituting "$a_x$" for the symbol "$a_a$" within the context [b, c] in the noisy signal $s_{noisy}$. DUDE denoises the noisy signal by replacing "$a_a$" in each occurrence of the metasymbol $ba_ac$ by that symbol "$a_x$" providing the least estimated distortion of the recovered signal with respect to the originally transmitted, clean signal, using the above expression. In other words, for each metasymbol $ba_ac$, DUDE employs the following transfer function to determine how to replace the central symbol $a_a$:

$$g^k(b, a_a, c) = \frac{\arg\min}{a_x = a_1 \text{ to } a_n} [m^T(s_{noisy}, b, c)\Pi^{-1}(\lambda_{a_x} \odot \pi_{a_a})]$$

In some cases, the minimum distortion is produced by no substitution or, in other words, by the substitution $a_x$ equal to $a_a$.

Figure 10:
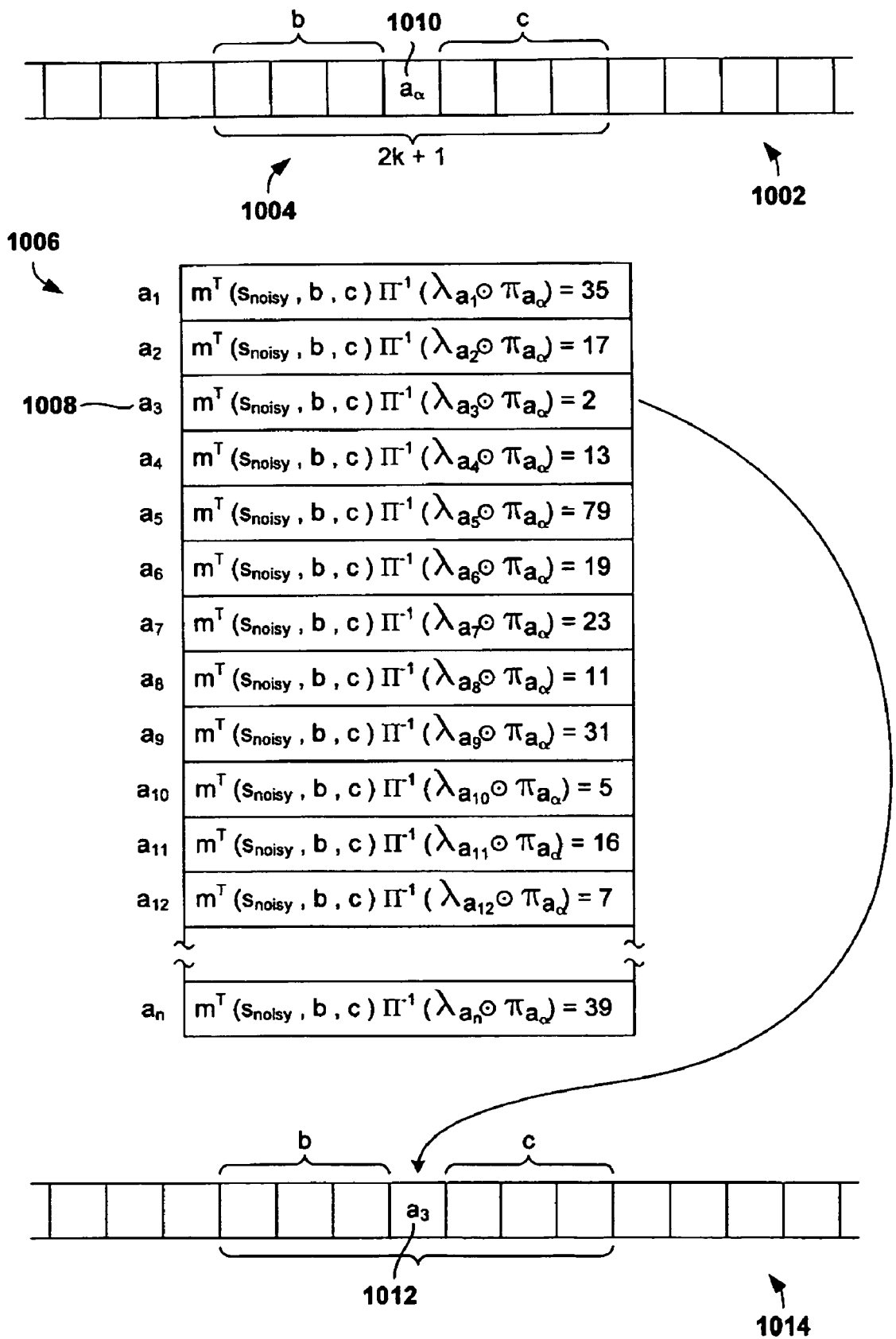
FIG. 10 illustrates the process by which a discrete denoiser denoises a noisy, received signal.

FIG. 10 illustrates the process by which DUDE denoises a noisy, received signal. First, as discussed above, DUDE compiles counts for all or a portion of the possible metasymbols comprising each possible symbol "$a_i$" within each possible context [b, c]: As discussed above, the counts are stored in column vectors $m(s_{noisy}, b, c)$. In the next pass, DUDE again passes a sliding window over the noisy signal 1002. For each metasymbol, such as metasymbol 1004, DUDE determines the relative distortions of the recovered signal with respect to the clean signal that would be produced by substituting for the central character of the metasymbol "$a_a$" each possible replacement symbol "$a_i$" in the range i=1 to n. These relative distortions are shown in table 1006 in FIG. 10 for the metasymbol 1004 detected in the noisy signal 1002. Examining the relative distortion table 1006, DUDE selects the replacement symbol with the lowest relative distortion, or, in the case that two or more symbols produce the same relative distortions, selects the first of the multiple replacement symbols with the lowest estimated distortion. In the example shown in FIG. 10, that symbol is "$a_3$" 1008. DUDE then replaces the central symbol "$a_a$" 1010 in the noisy signal with the selected replacement symbol "$a_3$" 1012 in the recovered signal 1014. Note that the recovered signal is generated from independent considerations of each type of metasymbol in the noisy signal, so that the replacement symbol selected in a previous step does not affect the choice for a replacement symbol in a next step for a different metasymbol. In other words, the replacement signal is generated in parallel, rather than substitution of symbols directly into the noisy signal. As with any general method, the above-described method by which DUDE denoises a noisy signal can be implemented using various data structures, indexing techniques, and algorithms to produce a denoising method that has both linear time and linear working-data-set complexities or, in other words, the time complexity is related to the length of the received, noisy signal, by multiplication by a constant, as is the working-data-set complexity.

The examples employed in the above discussion of DUDE are primarily 1-dimensional signals. However, as also discussed above, 2-dimensional and multi-dimensional signals may also be denoised by DUDE. In the 2-and-multi-dimensional cases, rather than considering symbols within a 1-dimensional context, symbols may be considered within a contextual neighborhood. The pixels adjacent to a currently considered pixel in a 2-dimensional image may together comprise the contextual neighborhood for the currently considered symbol, or, equivalently, the values of a currently considered pixel and adjacent pixels may together comprise a 2-dimensional metasymbol. In a more general treatment, the expression $m^T(s_{noisy}, b, c)\Pi^{-1}(\lambda_{a_x} \odot \pi_{a_a})$ may be replaced by the more general expression:

$$m^T(s_{noisy}, \eta)\Pi^{-1}(\lambda_{a_x} \odot \pi_{a_a})$$

where $\eta$ denotes the values of a particular contextual neighborhood of symbols.

The neighborhood may be arbitrarily defined according to various criteria, including proximity in time, proximity in display or representation, or according to any arbitrary, computable metric, and may have various different types of symmetry. For example, in the above-discussed 1-dimensional-signal examples, symmetric contexts comprising an equal number of symbols k preceding and following a currently considered symbol compose the neighborhood for the currently considered symbol, but, in other cases, a different number of preceding and following symbols may be used for the context, or symbols either only preceding or following a current considered symbol may be used.

Construction of Context Sets

Figure 11:
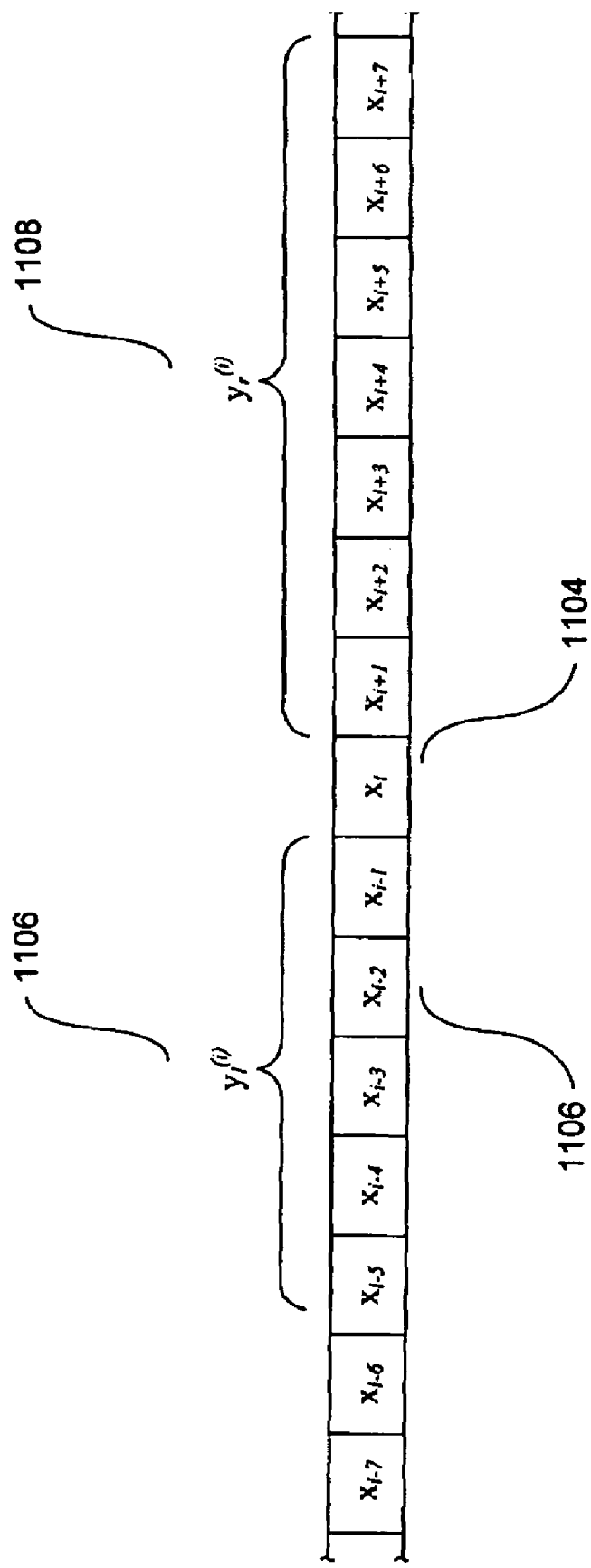
FIG. 11 illustrates a general denoising problem used as a basis for describing embodiments of the present invention.

FIG. 11 illustrates a general denoising problem used as a basis for describing embodiments of the present invention. The general denoising problem involves denoising a linear sequence 1102 of n symbols, in which each symbol x is taken from an alphabet X of a finite size:

$$x \in X$$

Note that, in this subsection, and in subsequent discussion, n denotes the length of a symbol sequence, rather than a symbol alphabet size, and the notation for a symbol alphabet is "X," rather than the previously used notation "A." During an analysis or processing of the sequence of symbols 1102 for denoising purposes, each symbol is separately considered within a generally two-sided neighborhood. When the symbol $x_i$ 1104 is considered, the neighborhood for symbol $x_i$ consists of a left neighborhood $y_l^{(i)}$ 1106 and a right neighborhood $y_r^{(i)}$ 1108. For the denoising problem, a context $(s_l, s_r)$ from a set of contexts S is selected for each currently considered symbol $x_i$, with:

$$(s_l, s_r) \in S$$
$$S \subseteq X^* \times X^*$$
$$s_l \subseteq X^*$$
$$s_r \subseteq X^*$$

where X* represents the set of finite-length strings of symbols x selected from the alphabet X.

In the following discussion, the length of a symbol subsequence s is designated as |s|. Each portion of the generally bi-directional contexts used in the denoising application has a maximal fixed size k, where:

$$k = \max_{(s_l, s_r) \in S} \max(|s_l|, |s_r|)$$

It is important to note that the value of k may range up to the length of the sequence, n. The size of a context portion may range from 0 to k, and the total size of a context $(s_l, s_r)$, given by $|s_l|+|s_r|$, can range from 0 to 2k. Each context $(s_l, s_r)$ can be uniquely mapped to a family of contexts by $P_{(s_l, s_r)}$ that includes all possible subsequences pairs $(x^k, y^k)$, each subsequence of the possible pairs having length k, the prefix of the first subsequence of each pair $x^k$ equal to $s_l$, and the prefix of the second subsequence of each pair $y^k$ equal to $s_r$. More compactly:

$$P_{(s_l, s_r)} = \{(x^k, y^k) \in X^k \times X^k : x^{|s_l|} = s_l, y^{|s_r|} = s_r\}$$

where $x^k$ is a sequence of symbols of length k, $X^k$ is the set of all possible sequences of symbols chosen from alphabet X of length k, and $x^{|s_l|}$ is a prefix of symbol string x with length equal to the length of the left portion of a context, $s_l$, also referred to as a "context string."

Figure 12:
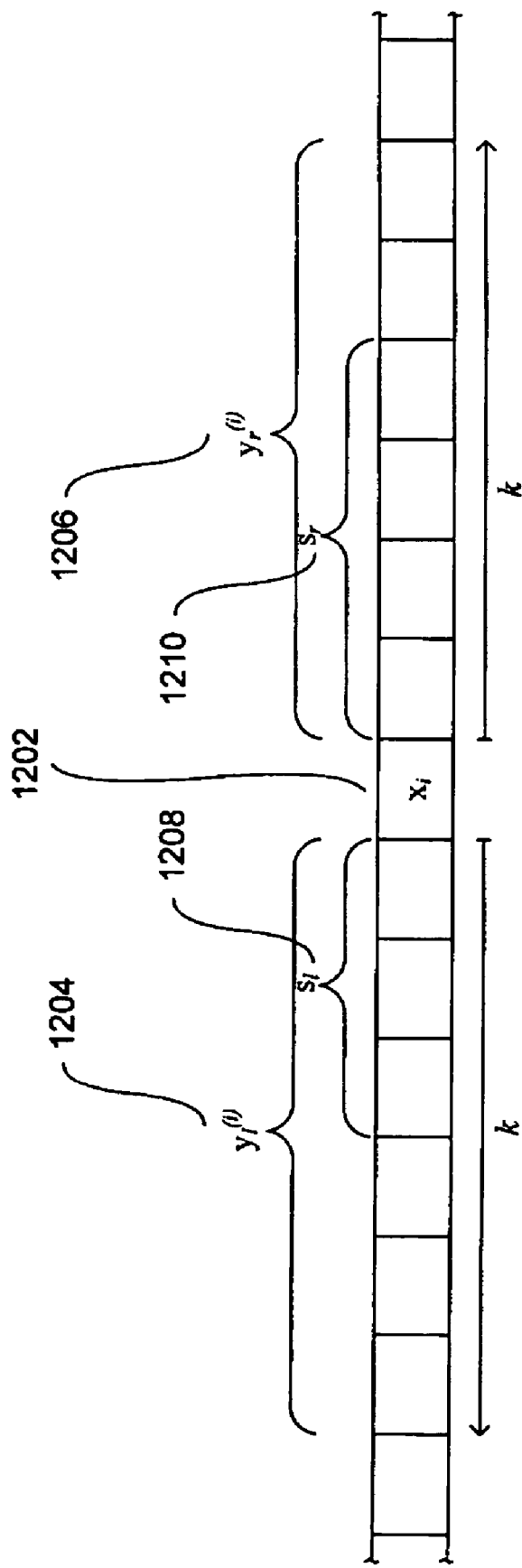
FIG. 12 indicates the relationships between a currently considered symbol $x_i$, a neighborhood of $x_i$, and a particular context for $x_i$.

FIG. 12 indicates the relationships between a currently considered symbol $x_i$, a neighborhood of $x_i$, and a particular context for $x_i$. As shown in FIG. 12, a currently considered symbol $x_i$ 1202 is preceded by a left neighborhood $y_l^{(i)}$ 1204 of length k, considered in reverse, and a right neighborhood $y_r^{(i)}$ 1206 of length k. In analyzing or processing symbol $x_i$ 1202, a left context $s_l$ 1208 and a right context $s_r$ 1210 are chosen as the context $(s_l, s_r)$ for $x_i$, with the left portion of the context $s_l$ a prefix of, or equal to, left neighborhood $y_l^{(i)}$ and the right portion of the context $s_r$ a prefix of, or equal to, the right neighborhood $y_r^{(i)}$.

For a context set S to be useful in a denoising application, and, indeed, in most applications, the context set S should meet two conditions provided below:

$$\text{exhaustive condition:} \bigcup_{(s_l, s_r) \in S} P_{(s_l, s_r)} = X^k \times X^k$$

$$\text{disjoint condition:} P_{(s_l, s_r)} \cap P_{(s'_l, s'_r)} = \emptyset \text{ when } (s_l, s_r) \neq (s'_l, s'_r)$$

The exhaustive condition basically states that the families $P_{(s_l, s_r)}$ of all the context elements within the context set S should collectively span all possible maximally sized contexts $X^k \times X^k$. In other words, the families $P_{(s_l, s_r)}$ of all the context elements within the context set S represent a partition of all possible maximally sized contexts $X^k \times X^k$. Another way of stating this is that there should be no neighborhood for which there is not a corresponding context:

$$\forall y_l^{(i)} \in X^k, y_r^{(i)} \in X^k, \exists (s_l, s_r) : (y_l^{(i)}, y_r^{(i)}) \in P_{(s_l, s_r)}$$

The disjoint condition essentially states that each possible neighborhood $(y_l^{(i)}, y_r^{(i)})$ is contained in a single family of contexts $P_{(s_l, s_r)}$ and hence is mappable to the corresponding context element $(s_l, s_r)$ of the context set S.

Considering an entire ordered sequence of symbols x, the set of symbols within x associated with a particular context $(s_l, s_r)$ are those symbols in x that can be found within context $(s_l, s_r)$. This can be expressed as:

$$x_{(s_l, s_r)} = \{x_i \in x : [y_l^{(i)}]^{|s_l|} = s_l \text{ and } [y_r^{(i)}]^{|s_r|} = s_r\}$$

where x is a signal of symbols $x_1, x_2, x_3, \ldots$.

The above-described disjoint condition can be expressed in terms of $x_{(s_l, s_r)}$ as follows:

$$\forall x_i \in x, x_i \in x_{(s_l, s_r)}, x_i \in x_{(s'_l, s'_r)} \Rightarrow (s_l, s_r) = (s'_l, s'_r)$$

Together, the exhaustive condition and the disjoint condition ensure that for any symbol $x_i$ within an ordered symbol string x, with the possible exception of the first and last k symbols of the ordered symbol string x, a unique context $(s_l, s_r)$ within the context set S can be found. Were this not the case, then a context-based analysis would be ambiguous, since any considered symbol might be altered in different ways depending on which of multiple contexts for the symbol were chosen for determining whether the symbol should be replaced and, if replaced, with which replacement symbol. While contexts are generally two-sided, it is possible for one of the two portions of a context, $(s_l, s_r)$, to have zero length, and for the context to therefore be one-sided.

Figure 13:
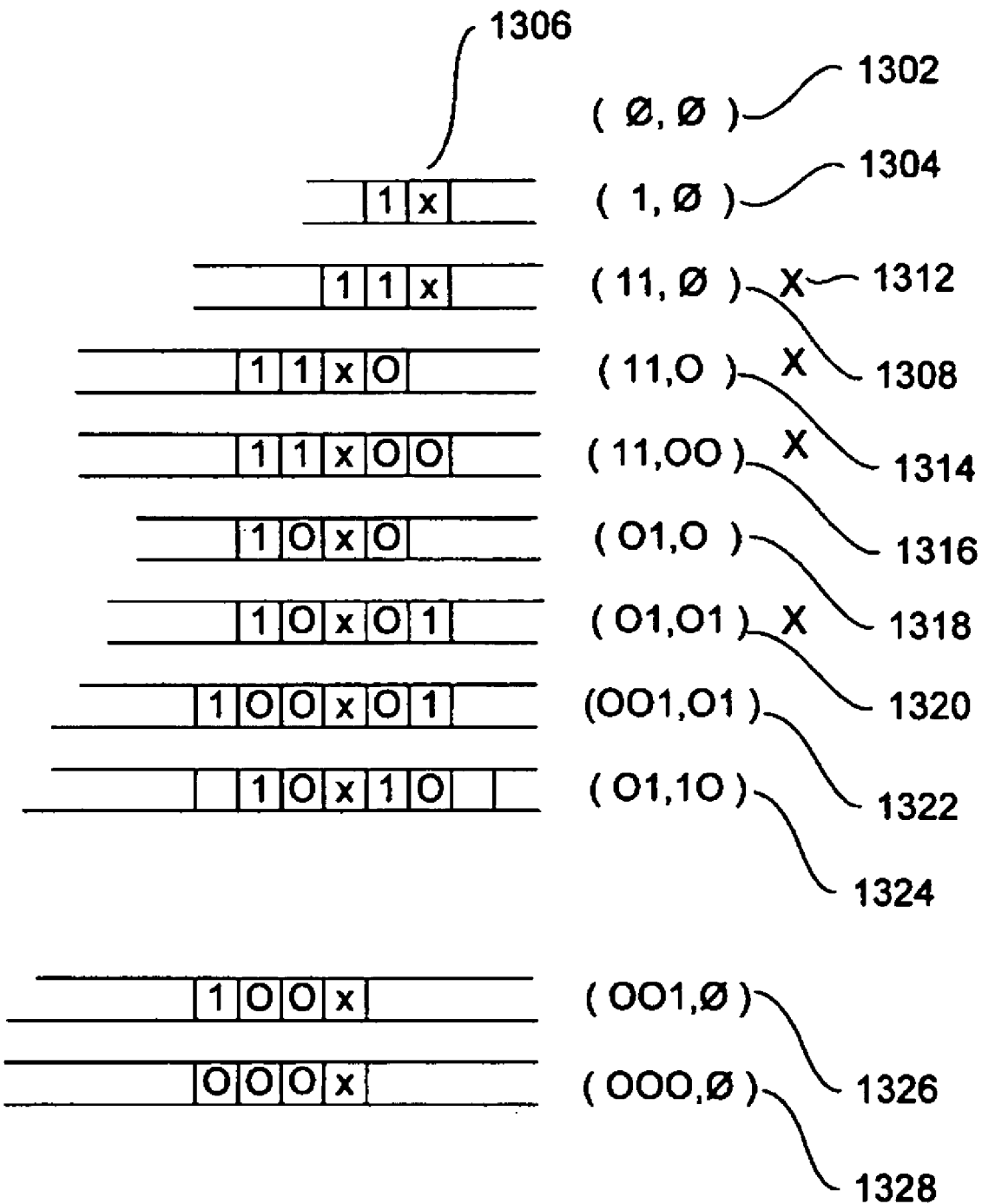
FIG. 13 illustrates steps that might be undertaken to construct a context set S that satisfies both the exhaustive and disjoint conditions.

Devising a context set S that meets both the exhaustive and disjoint conditions, discussed above, is non-trivial for context sets of which maximally sized contexts are not small, or, in other words, for context sets with k>a very small number. FIG. 13 illustrates steps that might be undertaken to construct a context set S that satisfies both the exhaustive and disjoint conditions. In the example shown in FIG. 13, the alphabet X includes the binary symbols "0" and "1." Initially, the context set S includes the empty context (Ø,Ø) 1302. A first, simple, and short context that may be included in context set S is the context (1,Ø) 1304, which corresponds to the symbol string 1306 where "x" indicates the currently considered symbol. Note that, in FIG. 13, the symbol orders for the string representation for the left portion of a context is reversed from the order of the symbols in the left portion shown in the parenthetical notation for the context. Therefore, the position of a symbol, in the parenthetical notational representation of the context, within either portion of the context with respect to the left-most symbol of the portion of the context indicates the distance of the symbol from the central symbol.

Having selected context (1,Ø) as the first context to include in the context set S, one might next decide to include the context (11,Ø) 1308. However, as can be seen by comparing the string representation 1310 of this context to the initially included context 1306, the new context and initially included context are not disjoint. In other words, both belong to the same family of contexts with the right-hand portion null and the left-hand portion beginning with symbol "1." Another way of considering the problem is that, considering the currently considered symbol and only the next symbol to the left of the currently considered symbol, it cannot be determined, without considering additional symbols, whether the currently considered symbol "x" has the context (1,Ø), the context (11,Ø), or both contexts. In other words, it should be the case that, as symbols of a neighborhood of a central symbol are chosen one by one, either no context is yet identified for the central system, or a context is unambiguously identified, and no further symbols of the neighborhood need to be examined. As discussed above, such ambiguities lead to problems in context-based analysis and processing. Thus, in FIG. 13, a large symbol "X" 1312 is placed next to the proposed, but not allowable, context (11,Ø)1308 to indicate that, having included context (1,Ø)1304 in the set S, proposed context (11,Ø)1308 cannot then be included.

The next two proposed contexts 1314 and 1316 also cannot be included in the context set S, for similar reasons. Note that the null sequence is a prefix of any sequence with length greater than or equal to one. Thus, once the context (1,Ø)is accepted, the context (11,0) cannot be accepted, since "1" is a prefix of "11" and "Ø" is a prefix of "0." The proposed context 1318 can be included, because there is no context ambiguity when considering symbols in the immediate neighborhood of the currently considered symbol "x" once it is determined that the currently considered symbol "x" belongs to either context (1,Ø)1304 or to context (01,0) 1318. The next proposed context 1320 is rejected, because of ambiguity with context (01,0) when two symbols to the left of the currently considered symbol "x," and one symbol to the right of the currently considered symbol "x," have been considered with respect to assigning a context to the currently considered symbol "x." The next two proposed contexts 1322 and 1324 are acceptable.

Thus, a context set S can be painstakingly constructed by insuring that once a currently considered symbol is determined to reside within any particular context of the set S, it cannot subsequently be found to reside within another of the contexts within the context set S by considering additional symbols of the neighborhood. However, as the size of the context set S grows, the problem of checking each new proposed context increases exponentially. For example, are the next two proposed contexts 1326 and 1328 allowable once contexts (1,Ø), (01,0), and (01,10) are included in context set S?

Bi-Directional Context Trees

Figure 14:
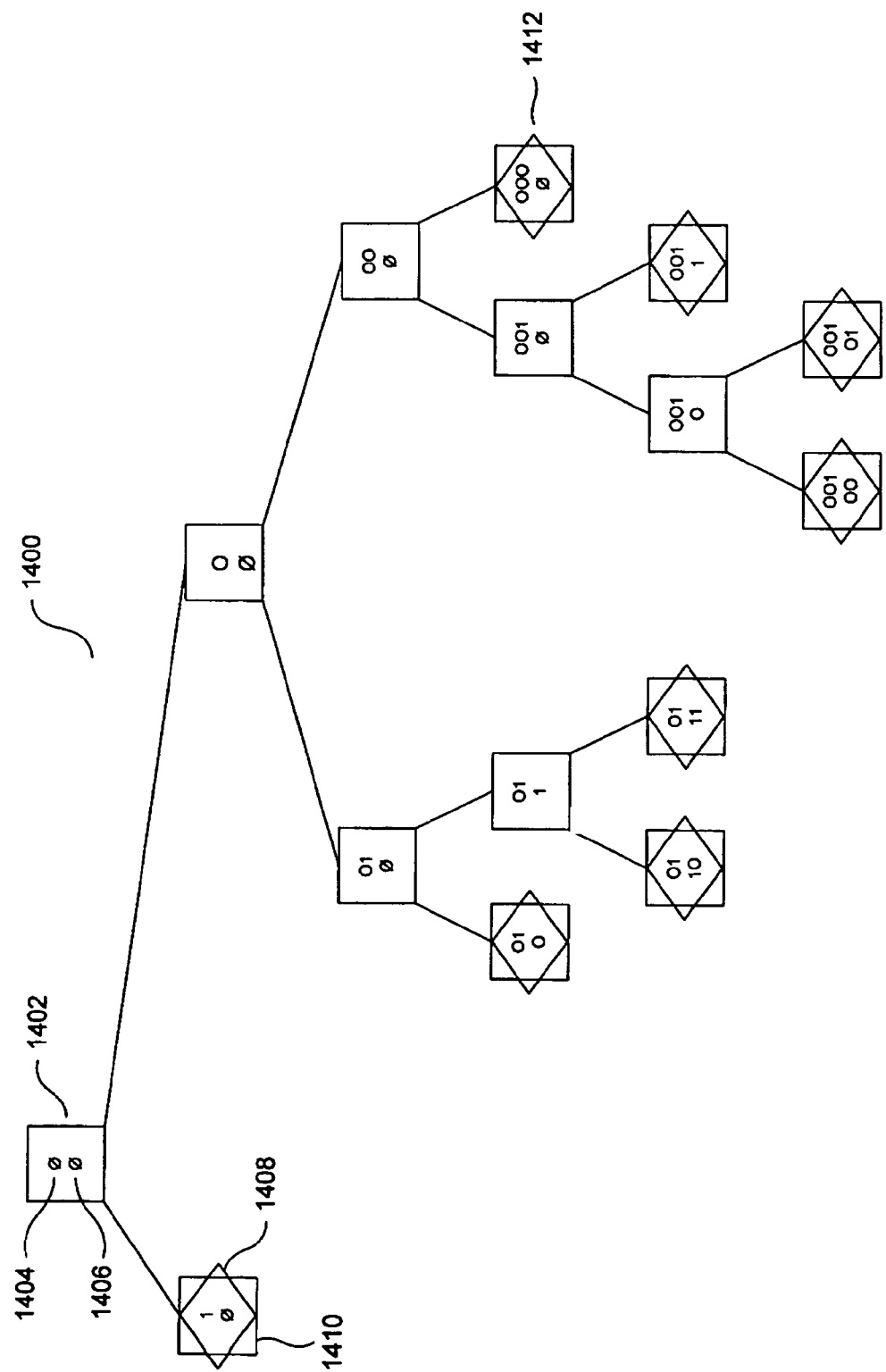
FIG. 14 illustrates a bi-directional context tree constructed for the binary alphabet {0,1}.

One approach to representing an exhaustive and disjoint context set S is to employ a bi-directional context tree. FIG. 14 illustrates a bi-directional context tree constructed for the binary alphabet {0,1}. The bi-directional context tree 1400 has root node 1402 representing the empty, or null, context (Ø,Ø) 1402. In FIG. 14, and in subsequent figures, the symbol string corresponding to the left-hand portion of a context represented by a node, $s_l$, occurs in the first, or top, position within the node 1404, with the symbol order reversed to the order used for the left context portion in the parenthetical notation of FIG. 13, and the symbol string representing the right-hand portion of the context represented by the node, $s_r$, occurs in the bottom, or second position 1406 within a node.

The bi-directional context tree 1400 can be constructed top-down from the root node 1402 using a few simple rules and making a few simple choices at each level of the tree. First, the children of any parent node represent contexts produced by adding one symbol either to the left context $s_l$ or to the right context $s_r$ of the parent, but not to both. Thus, moving from a parent node at a first level to the children of the parent node at a second level, a choice must be made whether to branch from the parent based on adding a symbol to the left portion of the context of the parent, $s_l$, referred to as a "left branch," or adding a symbol to the right portion of the context, $s_r$, referred to as a "right branch." The bi-directional context tree is complete, meaning that a node either has no children or has a number of children equal to the number of symbols in the alphabet X. Because the bi-directional context tree 1400 shown in FIG. 14 is based on the binary alphabet {0,1}, each node either has no children, and is referred to as a "leaf node," or has two children, and is referred to as an "internal node."

The exhaustive and disjoint context set S represented by the bi-directional context tree consists of all contexts represented by leaf nodes of the bi-directional context tree. In FIG. 14, the leaf nodes are marked with diamond-like symbols, such as diamond-like symbol 1408 superimposed over node 1410. The bi-directional context tree 1400 shown in FIG. 14 corresponds to the context set S that includes contexts (1,Ø), (01, 0), (001,01), and (01,10), discussed above with reference to FIG. 13. At this point, having constructed a bi-directional context tree to include these four contexts as leaf nodes, the above-asked question can be easily answered. The proposed context (001,Ø) (1326 in FIG. 13) cannot be allowed to be added to the context set S, because this context occurs as an internal node in the bi-directional context tree 1400 shown in FIG. 14. By contrast, the context (000,Ø) (1328 in FIG. 13) can be included in the context set S, and, in fact, either context (000,Ø), or leaf nodes of a subtree rooted at context (000,Ø), needs to be included in context set S to satisfy the exhaustive property, since a leaf node 1412 representing that context occurs in the bi-directional context tree 1400 shown in FIG. 14. Thus, when a bi-directional context tree is constructed according to the above-described method, the context set that includes all the contexts represented by leaf nodes in the tree is exhaustive and disjoint, and therefore useable in context-based analysis and processing.

Figure 15:
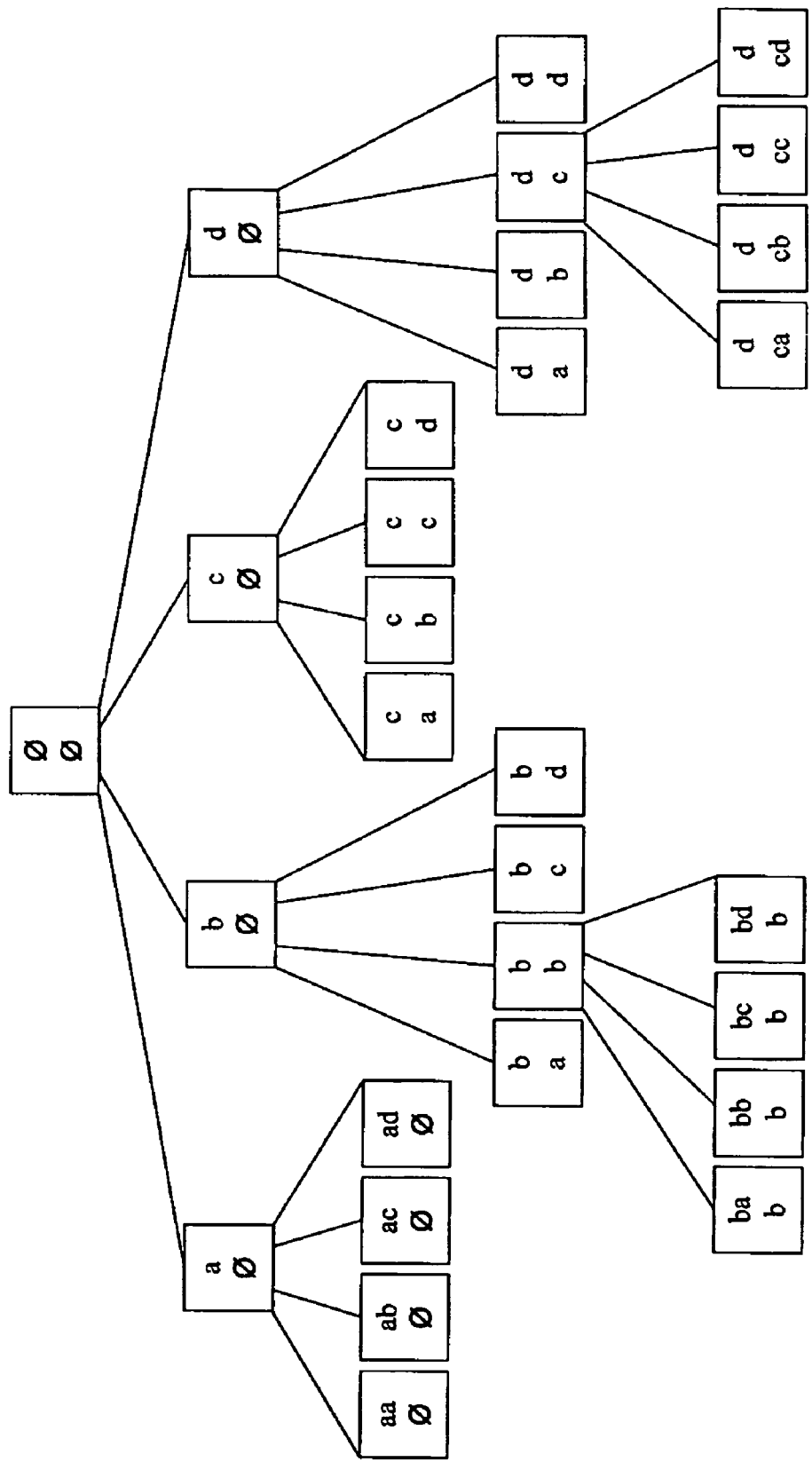
FIG. 15 shows a bi-directional context tree constructed for the four-symbol alphabet {a,b,c,d}.

As the size of the alphabet X increases, the branching multiplicity within a bi-directional context tree correspondingly increases. FIG. 15 shows a bi-directional context tree constructed using the four-symbol alphabet {a,b,c,d}. As the maximal context-portion length k increases, the depth of, or number of levels in, the corresponding bi-directional context tree may correspondingly increase. Thus, although a bi-directional context-tree construction method provides a simple conceptual framework for constructing exhaustive and disjoint context sets, the problem of enumerating all possible context sets for a particular alphabet and maximal context-portion size k can become computationally infeasible, particularly when possible context sets need to be evaluated for efficiency and accuracy when employed in particular processing or analysis tasks in particular problem domains.

EMBODIMENTS OF THE PRESENT INVENTION

One embodiment of the present invention provides a method for constructing an optimal or near-optimal context set S for a given alphabet X and a given problem domain comprising an analysis or processing technique, such as a particular type of denoising, and a symbol sequence to be processed or analyzed. The problem domain partially determines a weighting function used by the method to construct the optimal or near-optimal context set S in a bottom-up, bi-directional-context-tree-based fashion. In one approach, the weight of a context set S, L(S), is the sum of the weights $\lambda$ of the symbols associated with each context, $x_{(s_l,s_r)}$, summed over all contexts $(s_l,s_r)$ within the context set S:

$$L(S) = \sum_{(s_l,s_r) \in S} \lambda(x_{(s_l,s_r)})$$

Determination of an optimal or near-optimal context set $S_{opt}$ involves selecting a valid context set S with a minimum weight L(S):

$$S_{opt} = \frac{\min}{S \subseteq X^* \times X^*} L(S)$$

The minimization is over all valid context sets S that satisfy the exhaustive and disjoint conditions. When L(S) is a reasonably accurate weighting for a context set for the given problem domain and processing technique, a context set with a minimum weight L(S) may be truly optimal, but when L(S) is a less accurate estimate of the weighting for a context set for the given problem domain, a context set with a minimum L(S) may be either optimal or near optimal.

In constructing a bi-directional context tree, the weight of a particular node is the weight of the context represented by the node:

$$w(s_l,s_r) = \lambda(x_{(s_l,s_r)})$$

When there are no symbols associated with the context in the symbol string x to be analyzed or processed, then the context weight is 0:

$$w(s_l,s_r) = 0 \text{ when } x_{(s_l,s_r)} = \emptyset$$

The weight of a bi-directional context tree, or subtree within a bi-directional context tree, is computed as the sum of the weights of all leaf nodes of the bi-directional context tree or subtree:

$$w(\text{tree}) = \sum_{(s_l,s_r) \in \text{leaf nodes}} w(s_l, s_r)$$

High-Level Pseudocode Embodiment of the Present Invention

A high-level pseudocode implementation of a routine "optimumCTree" that constructs an optimal or near-optimal context set based on a given alphabet X and a weighting function w( ) particular to an analysis or processing method and a particular problem domain is next discussed. In this pseudocode implementation, a minimal weight bi-directional context tree, which may be incorporated as a subtree into a larger context tree, with a root node representing the context $(s_l,s_r)$ and with a total weight $w^*(s_l,s_r)$ equal to the weight of all leaf nodes of the minimal weight context tree, is represented as "$T_{opt}(s_l,s_r)$." The context tree $T_{opt}(s_l,s_r)$ may also be represented as a list of contexts, each context represented by a node in the tree, and the weight of the tree, as, for example: $\{(s_l,s_r), (s_l,s_r,x_1), (s_l,s_r,x_2), \ldots ; w^*(s_l,s_r)\}$. The tree, or list of nodes in the tree, can be extracted from a context tree by the function t( ), and the weight of a context tree can be extracted by the weighting function w( ) supplied as an argument to the pseudocode routine "optimumCTree." The weighting function can be, in other words, applied to a context or a tree. For example, in the above example, $t(T_{opt}(s_l,s_r)) = \{(s_l,s_r),(s_l,s_r,x_1), (s_l,s_r,x_2), \ldots \}$ and $w^*(T_{opt}(s_l,s_r)) = w^*(s_l,s_r)$. The pseudocode routine "optimumCTree" follows:

```
1   optimumCTree (w())
2   begin
3       for each (s_l, s_r) ∈ X^k × X^k
4       begin
5           T_opt (s_l, s_r) = {[(s_l, s_r); w(s_l, s_r)]}
6       end
7
8       for m = 2k − 1 to 0
9       begin
10          for each (s_l, s_r):|s_l| + |s_r| = m
11          begin
12              cw = w(s_l, s_r)
13              rw = ∑_{x∈X} w*(T_opt(s_l, s_r x))
14              lw = ∑_{x∈X} w*(T_opt(s_l x, s_r))
15              if (cw < rw && cw < lw)
16              begin
17                  T_opt(s_l, s_r) = {[(s_l, s_r); cw]}
18              end
19              else if (rw < lw)
20              begin
21                  T_opt(s_l, s_r) = {(s_l, s_r) ∪_{x∈X} t(T_opt(s_l, s_r x)); rw}
22              end
23              else
24              begin
```

-continued

```
25          T_opt(s_l, s_r) = {(s_l, s_r) ∪_{x∈X} t(T_opt(s_l x, s_r)); lw}
26              end
27           end
28        end
29        return T_opt(ø, ø)
30  end
```

The routine "optimumCTree" receives the weighting function w( ) as an argument. In general, the weighting function is problem-domain dependent, and may be computed recursively or iteratively during analysis and processing of a particular sequence, or problem domain. The weighting function may, in certain embodiments, be obtained directly from occurrence counts or other statistical quantities directly obtained from the sequence to be analyzed. Occurrence counts are generally associated with lowest-level, maximal nodes, and are gathered recursively over internal nodes to generate weights.

In the first for-loop of lines 3-6, the routine "optimumCTree" constructs all possible maximally sized contexts, assigning each as a single node to a separate context tree with the context as root node, the node including not only the context $(s_l,s_r)$, but also the weight $w(s_l,s_r)$ for each of the maximally sized contexts. These nodes are the lowest possible nodes for the final optimal or near-optimal bi-directional context tree constructed by the routine "optimumCTree," but may not survive the subsequent construction and pruning processes. Next, in the for-loop of lines 8-28, successively higher levels of nodes are constructed, one level per iteration of the for-loop of lines 8-28, with nodes at lower levels potentially pruned as they become inaccessible from higher levels of the tree. Note that the for-loop iterates from a loop-variable m value equal to one less than the maximum total context size 2k to the value 0, representing the highest level within the context tree comprising a single root node representing the null context (Ø,Ø).

In the inner for-loop of lines 10-27, each context at the current level m is considered. Note that the level m corresponds to the total length of both portions of a context string, $|s_l|+|s_r|$. For each context $(s_l,s_r)$ at the current level m, the weight of the context, cw, is computed on line 12, the weight of the subtree rooted at a node representing the context, should a right branch be taken from this node to its children, rw, is computed on line 13, and the weight of the children should a left branch be taken from this node, lw, is computed on line 14. The weighting functions w( ) and w*( ) return a very large-magnitude value, larger than a legitimate weight for a context or tree, when the argument is not valid with respect to the problem domain. For example, when m=2k−1, only one of a left branch or right branch is possible from each node at that $m^{th}$ level of the tree, since one of the two portions of the context $s_r$ and $s_l$ has the maximum length k. If, for a node at the $m^{th}$ level, $|s_r|=k$, then the context $(s_l,s_r x)$ is not possible, since $|s_r|>k$ in that case, so $w*(T_{opt}(s_l,s_r))$ returns a very large-magnitude value to ensure that a right branch will not be taken from this node based on the value of rw computed on line 13. If the weight of the currently considered node cw is less than both rw and lw, as determined on line 15, then the optimal bi-directional context tree rooted at the current node, $T_{opt}(s_l,s_r)$, is assigned to be the current node only. In other words, the current node becomes a leaf node. Otherwise, if the weight of the subtree rooted at the current node, should a right branch be taken from the current node, rw, is less than lw, as determined on line 19, then the optimal or suboptimal bi-directional context tree rooted at the current node $T_{opt}(s_l, s_r)$ is assigned to be the subtree rooted at the current node and including all minimal weight subtrees included in a right branch from the current node. Otherwise, on line 25, the optimal or suboptimal bi-directional context tree rooted at the current node, $T_{opt}(s_l,s_r)$ is assigned to be the current node and all minimal weight subtrees included in a left branch from the current node. As the for-loop of lines 8-28 iterates, the data structure may be more greatly pruned, depending on the weighting functions w( ) and w*( ). Note that, when both a right branch and a left branch would produce subtrees of equal weight, the left branch is arbitrarily chosen. This represents an arbitrary selection of a portion of the possible optimal trees at each node with equal weight left-branch and right-branch progeny. The option of making the current node a leaf is not chosen in the case that both right-branch and left-branch operations would produce subtrees of equal weight. Following completion of the for-loop of lines 8-28, a single optimal or near-optimal bi-directional context tree rooted at the null context (Ø,Ø) remains, and is returned as the result of execution of the routine "optimumCTree."

Exemplary Bottom-Up. Optimal or Near Optimal Context Tree Construction

Figure 16A:
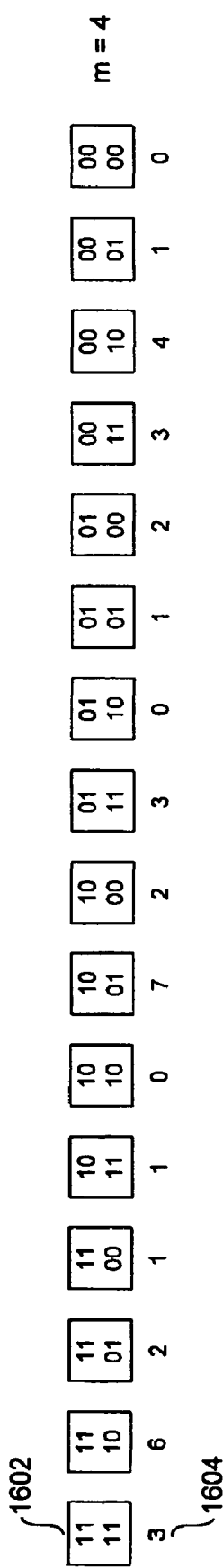
Figure 16B:
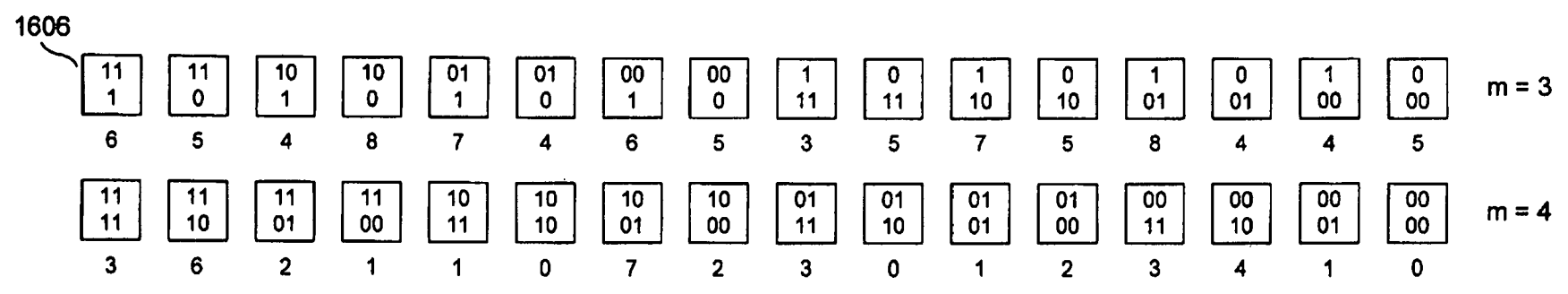
Figure 16C:
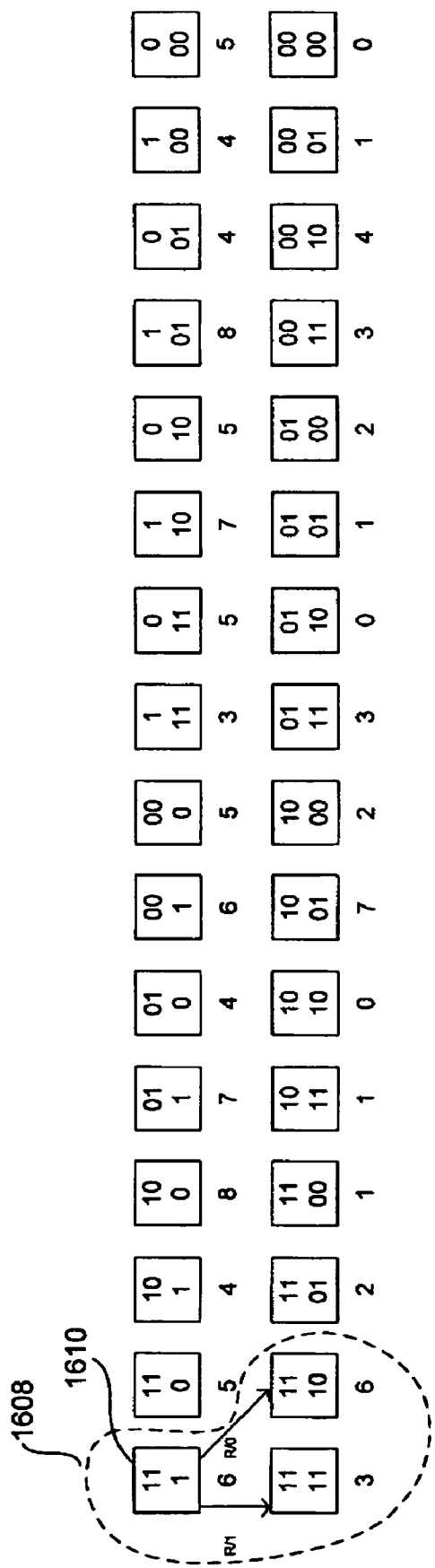
Figure 16D:
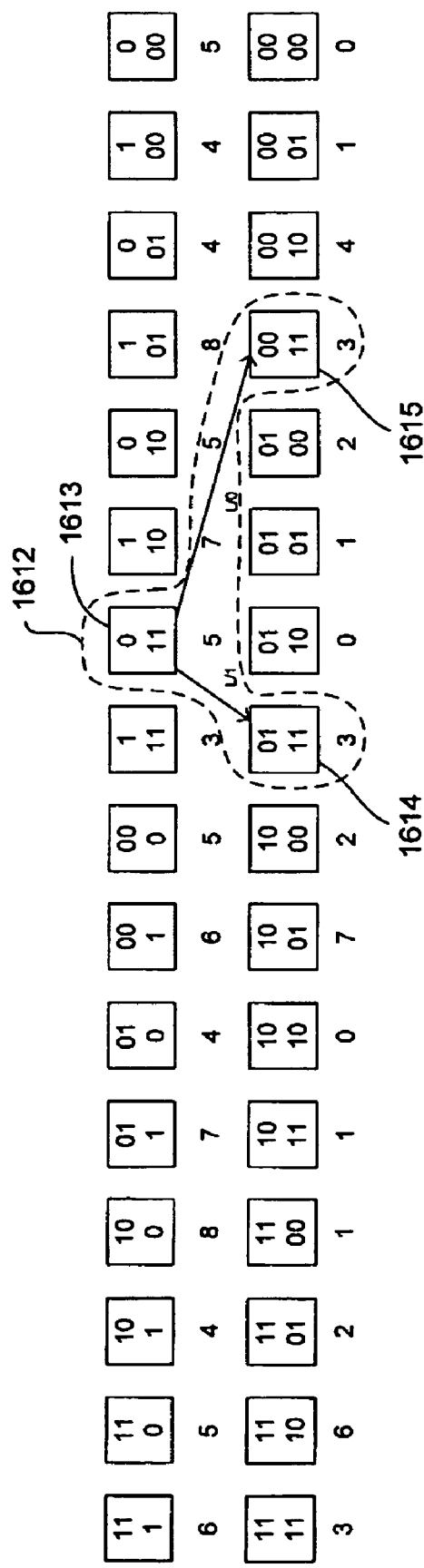
Figure 16E:
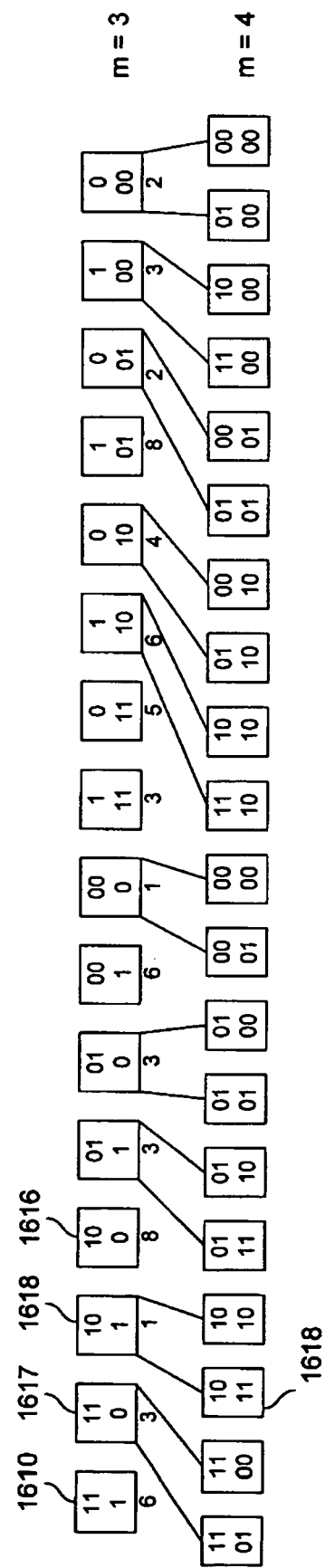
Figure 16F:
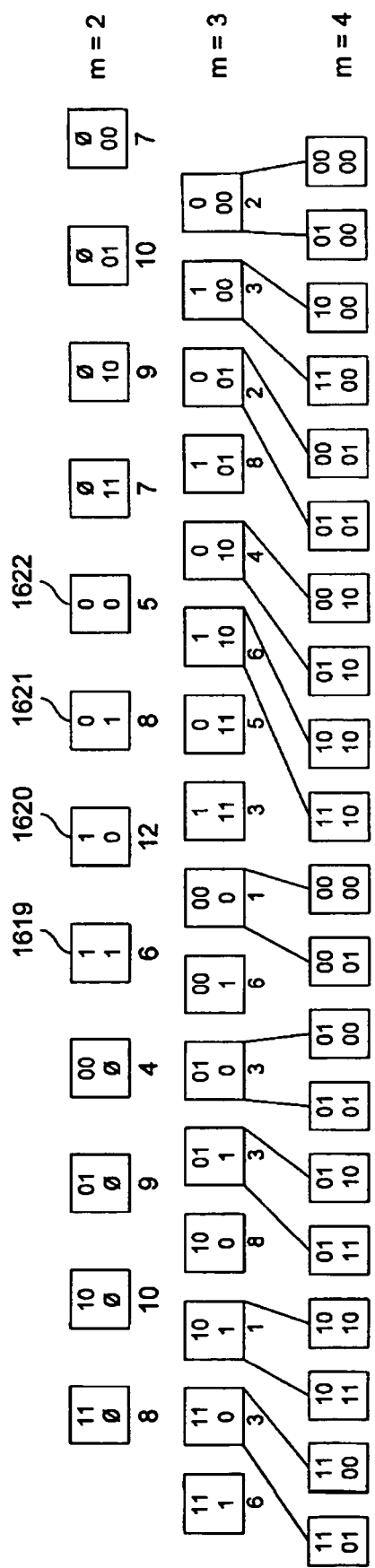
Figure 16G:
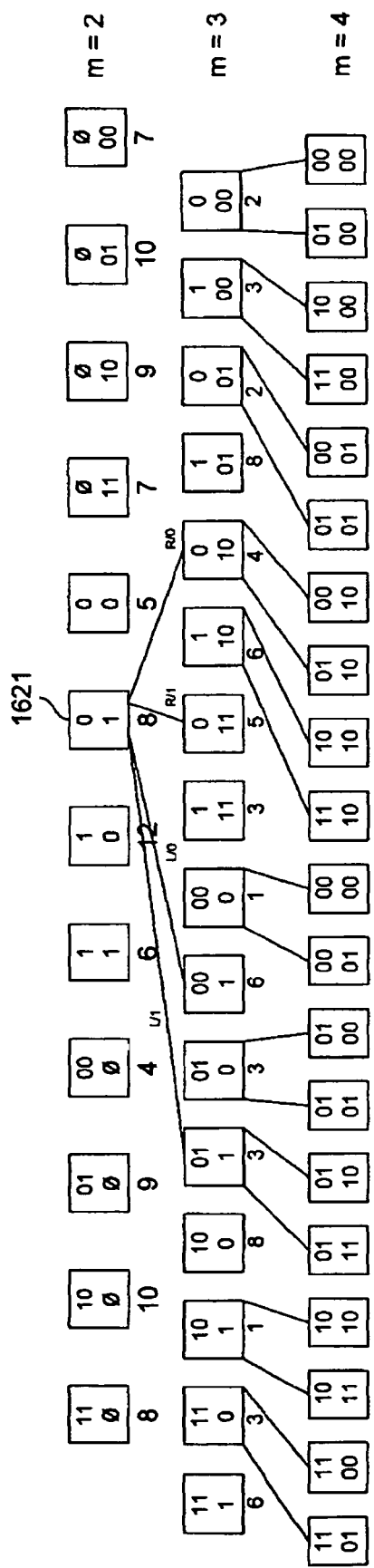
Figure 16H:
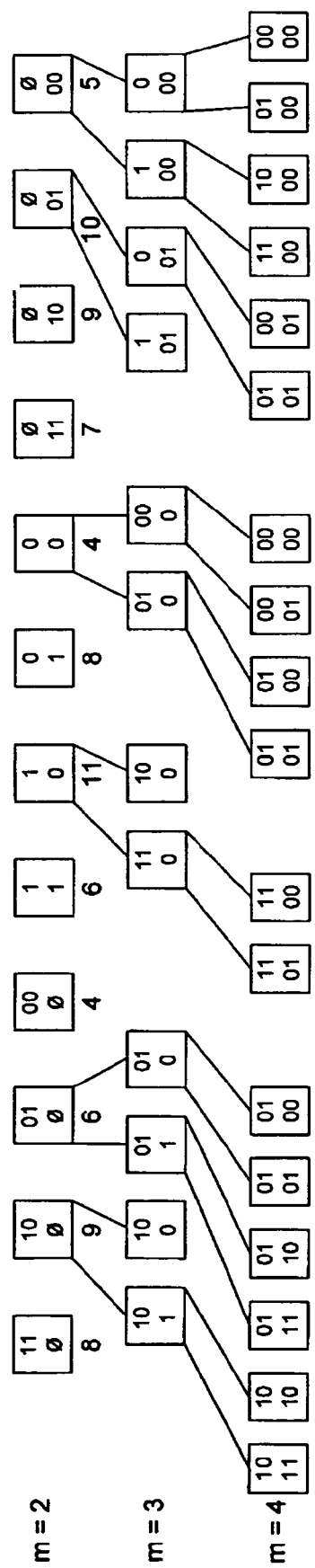
Figure 16I:
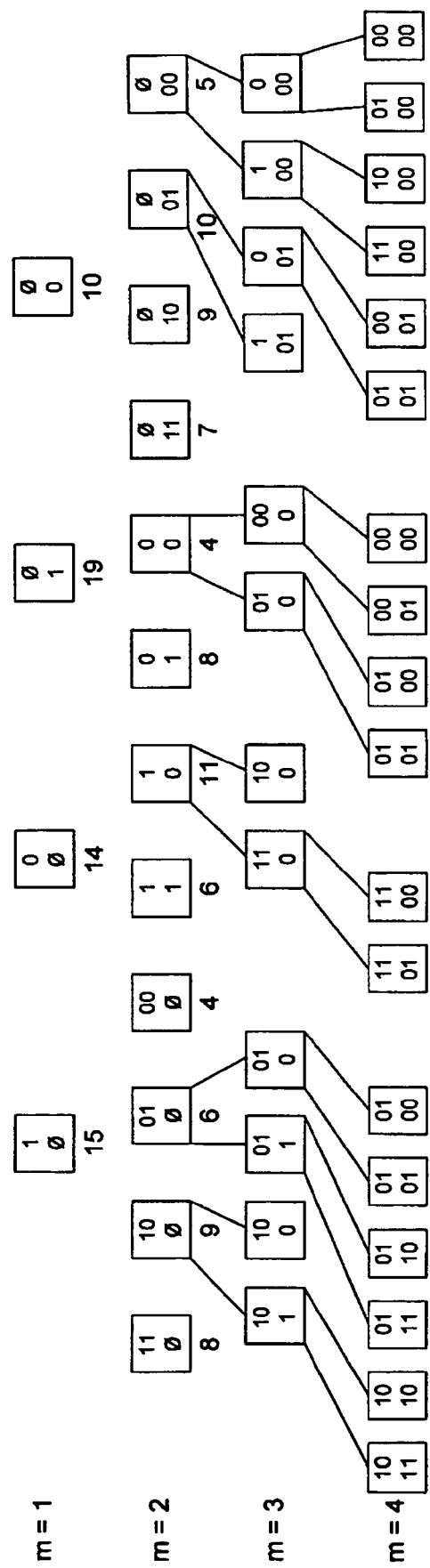
Figure 16J:
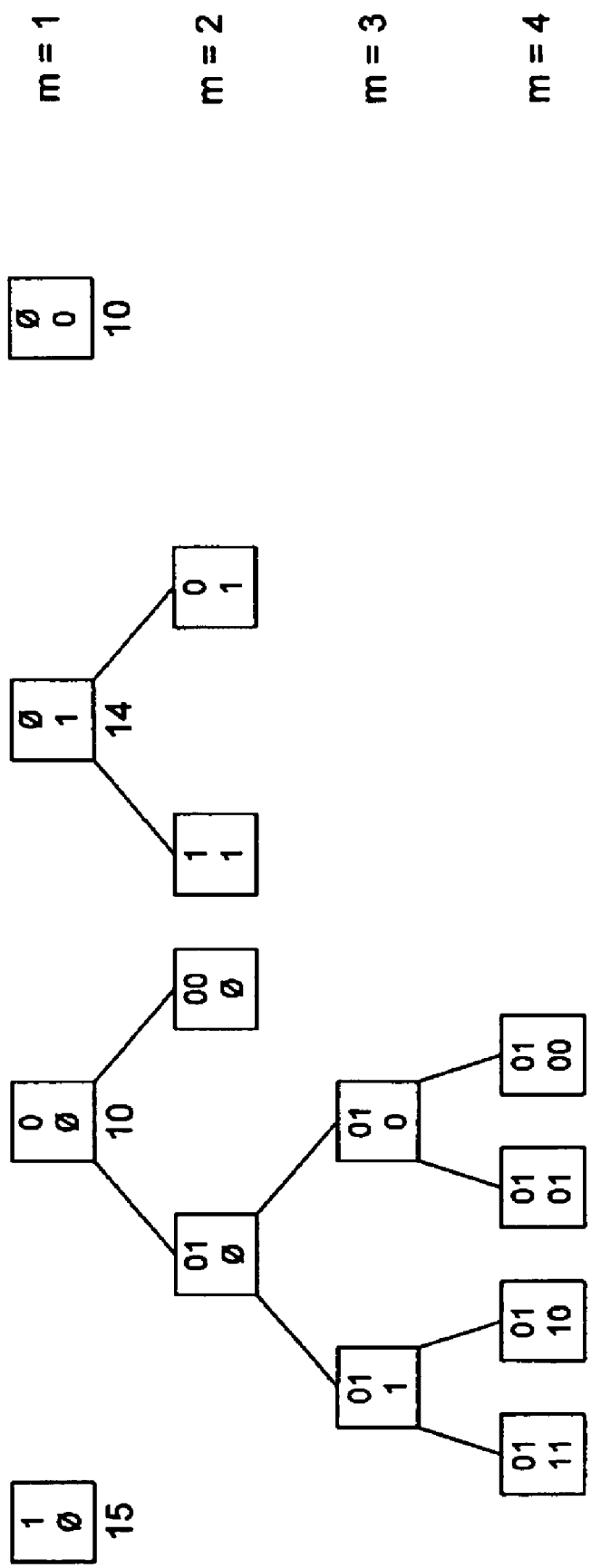
Figure 16K:
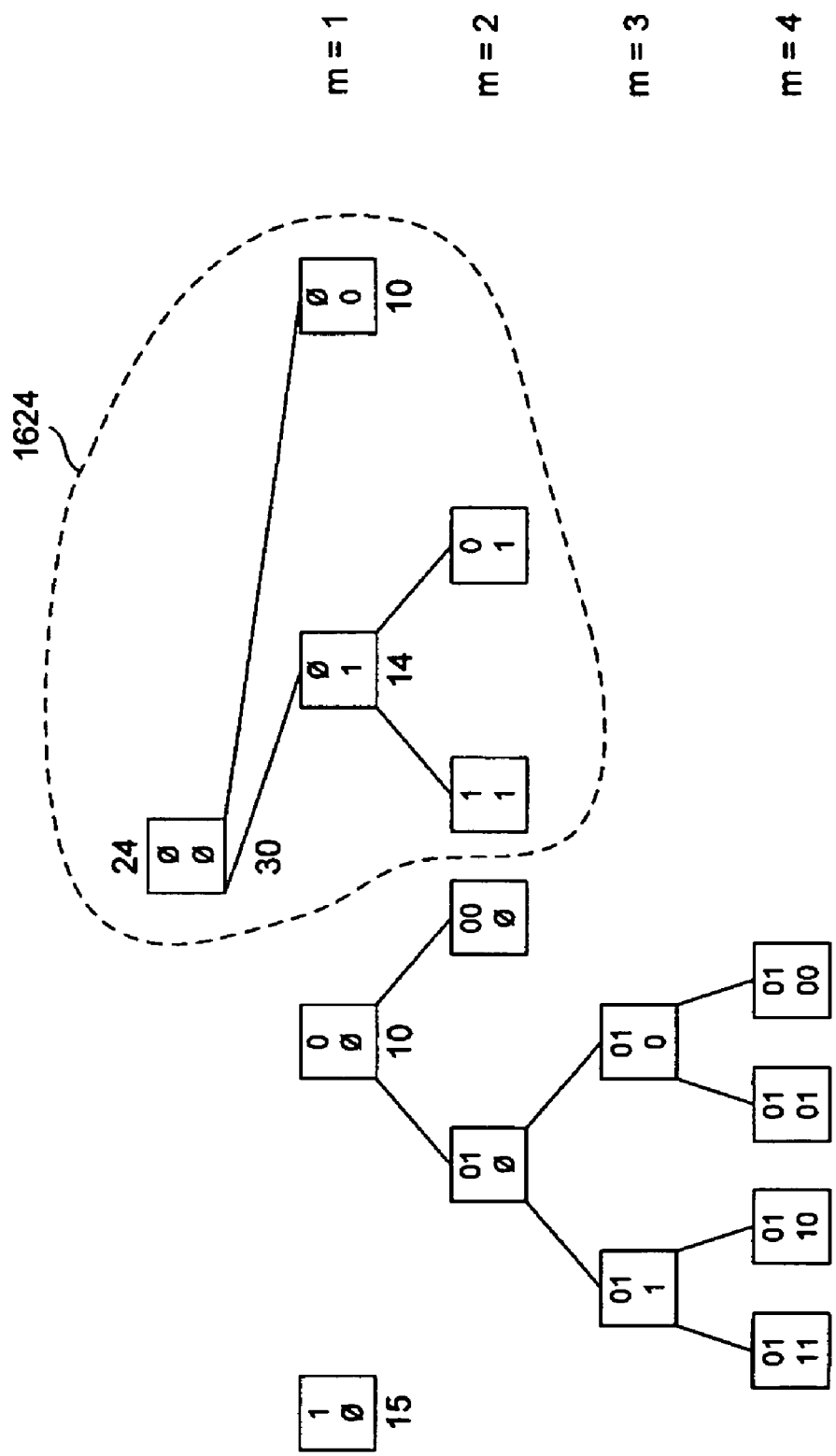

FIGS. 16A-K illustrate construction of a simple bi-directional context tree based on the binary alphabet {0,1} and k=2 by the method embodied in the routine "optimumCTree." FIGS. 16A-K use the same illustration conventions as used in FIGS. 14 and 15, discussed above. In addition, the weights associated with various nodes are shown in FIGS. 16A-K as integers associated with the various nodes. For example, in FIG. 16A, the node 1602, representing the context (11,11), has an associated weight of 3 (1604 in FIG. 16A). In the first step of the routine "optimumCTree," represented by the first for-loop of the routine discussed above, the lowest possible level of nodes representing all possible contexts with both context portions having maximum lengths of 2 are created, as shown in FIG. 16A. Next, as shown in FIG. 16B, a next-lowest-level of nodes 1606 is constructed in the first iteration of the for-loop of lines 8-28. Each of the newly constructed, next-lowest-level nodes 1606 is then separately considered. The weight of the subtree 1608 emanating from the first of these nodes 1610 as a result of a right branch, rw, is computed as 9, the sum of the weights of the leaf nodes of the subtree, as shown in FIG. 16C. In FIG. 16D, the weight of the subtree 1612 emanating from node 1613 via a left branch, lw, is computed to be 6, the sum of the weights of the leaf nodes 1614-1615 of the subtree 1612. Comparing cw and lw computed for node 1613, the lowest of the weights is that of the node 1613, and so the $3^{rd}$ level node 1613 becomes a leaf node at the $3^{rd}$ level. In the case of other $3^{rd}$ level nodes, the sum of the weights of the leaf $4^{th}$ level nodes resulting from a left or right branch from the $3^{rd}$ level node is less than the weight of the $3^{rd}$ level node, and so the $3^{rd}$ level node is split to form a subtree. FIG. 16E illustrates the result of completion of the for-loop of lines 8-28 for m=3. Certain nodes in the $3^{rd}$ level, including nodes 1610 and 1616, are leaf nodes, while other nodes in the $3^{rd}$ level, including nodes 1617 and 1618, are root nodes of two-level subtrees. FIGS. 16F-H illustrate construction of $2^{nd}$ level nodes, and consideration of each $2^{nd}$ level node in the for-loop of lines 8-28 for being leaf nodes or roots of subtrees. At the $2^{nd}$ level, with m=2, nodes 1619-1622 can branch in either the left or right directions. FIG. 16G shows the possible left and right branches for $2^{nd}$ level node 1621. FIG. 16H shows the result of completion of the for-loop of lines 8-28 for level m=2. FIG. 16I-J illustrate creation and consideration of the nodes of the 1st level, and FIG. 16K shows a final context tree 1624 with a weight of 24, obtained by a right branch from a root node with weight 30, that results from application of the routine "optimumCTree" to the problem domain illustrated in FIGS. 16A-K. The final, resulting optimal or near-optimal context tree 1624 is a product of the method embodied in the routine "optimumCTree" as well as the weighting function w( ) supplied as an argument to the routine "optimumCTree." The final bi-directional, optimal or near optimal context tree 1624 having the lowest possible weight based on the weight assignments of individual nodes is returned by the routine "optimumCTree." The routine "optimumCTree" applies to construction of optimal bi-directional context trees for any finite alphabet and any supplied weighting function w( ).

C++-Like Pseudocode Embodiment of the Present Invention

As yet another embodiment and example of the bi-directional context tree construction method of the present invention, a C++-like pseudocode implementation is next provided. This C++-like pseudocode implementation is relatively sparsely annotated, in view of the lengthy discussion of the initial, high-level pseudocode implementation and example of FIGS. 16A-K, provided above. The C++-like pseudocode implementation is provided as an example code-level implementation for illustration purposes only. Implementations directed to useful problem domains may generally involve much longer maximum context-portion lengths k, and a much larger alphabet, and would generally therefore employ different strategies for storing and representing contexts and, most importantly, for dealing with the exponential growth in space and time resources needed for optimal or near-optimal tree construction.

First, a number of constants and an enumeration are provided:
1 const int MAX_K=4;
2 const int SYMBOL_SZ=2;
3 const int ALPHABET_SZ=4;
4 enum split {BRANCH_R, BRANCH_L, LEAF};
5 const unsigned short int MAX_WEIGHT=0xFFFF;
6 const int MAX_NODES=66000;
These constants and enumeration specify the maximum context portion size k, the size in bits needed to specify a symbol of the alphabet X, the number of symbols in the alphabet X, an enumeration to represent the right branch, left branch, and no branch operations, one of which is applied to each considered node during bottom-to-top tree construction and pruning, a large weight used to indicate that a subtree associated with the large weight is not a possible subtree for the problem domain, and a maximum number of nodes for a data structure, respectively.

Next, a class "node" is declared to represent a two-sided context in a bi-directional context tree. An instance of the class "node" represents a node in a bi-directional context tree. In the current implementation, the currently considered level of nodes, and the previous level of nodes, are both stored in arrays, and the nodes are instantiated only for levels below the previous level of nodes. This is done, because, in general, many intermediate-level nodes become leaf nodes as tree construction progresses, and subtrees of nodes below the would need to be deleted. The node class does not need to store a weight, since weights can be moved upward in the tree as levels are added. The class node follows

```
1  class node;
2  typedef node* NODEPTR;
3  class node
4  {
5     private:
6         unsigned char leftCSize;
7         unsigned char rightCSize;
8         unsigned char leftC;
9         unsigned char rightC;
10        NODEPTR ptrs[ALPHABET_SZ];
11    public:
12        void setCs(unsigned char lSz, unsigned char l,
13               unsigned char rSz, unsigned char r)
14            {leftCSize = lSz; leftC = l; rightCSize = rSz;
                rightC = r;};
15        void setPtr(NODEPTR p, int i) {ptrs[i] = p;};
16        NODEPTR getPtr(int i) {return ptrs[i];};
17        unsigned char getRightCSize( ) {return rightCSize;};
18        unsigned char getLeftCSize( ) {return leftCSize;};
19        unsigned char getRightC( ) {return rightC;};
20        unsigned char getLeftC( ) {return leftC;};
21        node ( );
22 };
```

Next, a type definition for a structure, "NASCENT_NODE," is provided. The currently and previously levels of nodes are stored in arrays of NASCENT_NODE instances:

```
1 typedef struct nascentNode
2 {
3         unsigned short int weight;
4         NODEPTR node;
5         unsigned short int ref;
6 } NASCENT_NODE;
```

Arrays of structures of the type "NASCENT_NODE" are employed in the class "nLevel," representing a level of nodes within a bi-directional context tree, a declaration for the class "nLevel" provided next:

```
1  class nLevel
2  {
3     private:
4         NASCENT_NODE nodes[MAX_NODES];
5         int sz;
6         int context_sz;
7         int multiplicity;
8         int maxL;
9
10    public:
11        int convert(unsigned char leftC, int leftCSize,
12               unsigned char rightC, int rightCSize);
13        void convert(int i, unsigned char & leftC, int & leftCSize,
14               unsigned char & rightC, int & rightCSize);
15        NODEPTR getNode(int i) {return nodes[i].node;};
16        void setNode(int i, NODEPTR n) {nodes[i].node = n;};
17        unsigned short int getWeight(int i) {return
              nodes[i].weight;};
18        void setWeight(int i, unsigned short w) {nodes[i].weight
              = w;};
19        unsigned short int getRef(int i) {return nodes[i].ref;};
20        void setRef(int i, unsigned short r) {nodes[i].ref = r;};
21        void incRef(int i) {nodes[i].ref++;};
22        int getSize( ) {return sz;};
23        void init(int m);
24 };
```

The format for a weight function is then provided in the type definition of a pointer to a weighting function, "WEIGHT," as follows:

```
1    typedef unsigned short int (*WEIGHT)(unsigned char leftC, int
     leftCSize,
2              unsigned char rightC, int rightCSize);
```

Finally, the class "CTree," representing a bi-directional context tree such as the bi-directional context tree shown in FIGS. 22, 23, and 24O, is provided:

```
1    class CTree
2    {
3        private:
4            nLevel lvls[2];
5            int m;
6            WEIGHT Weight;
7            nLevel* top;
8            nLevel* next;
9            int nextLNodes[ALPHABET_SZ];
10           node nextLData[ALPHABET_SZ];
11           int nextRNodes[ALPHABET_SZ];
12           node nextRData[ALPHABET_SZ];
13           NODEPTR tree;
14           int sym_mask;
15
16           void firstLevel( );
17           bool nextLevel( );
18           void switchLvl( );
19           split split3way(unsigned short int & w, unsigned
                 char leftC,
20                    int leftCSize, unsigned char rightC, int
                      rightCSize);
21           void branch(int i, split s, unsigned short int w,
                 unsigned char leftC,
22                    int leftCSize, unsigned char rightC, int
                      rightCSize);
23           void cleanup(int i);
24           void destroyTree(NODEPTR p);
25           NODEPTR copyTree(NODEPTR p);
26
27       public:
28           CTree(WEIGHT wt);
29    };
```

A constructor for the class "node" is next provided:

```
1 node::node( )
2 {
3        setCs(0,0,0,0);
4        for (int i = 0; i < ALPHABET_SZ; i++) ptrs[i] = 0;
5 }
```

Next, implementation of two different function members "convert" are provided for the class "nLevel." These function members allow an index into an array of nascent_node structures to be converted into a context, and a context to be converted into an index into an array of nascent_node structures. All possible contexts at a node level can then be obtained as an ordered set of nodes having contexts with increasing numerical values. There may be multiple nodes having the sane numerical value, but each having different values for the sizes of the left and right contexts $s_l$ and $s_r$.

```
1    void nLevel::convert(int i, unsigned char & leftC, int &
     leftCSize,
2              unsigned char & rightC, int & rightCSize)
3    {
4        unsigned short int dex;
5        unsigned short int mask = 0;
6
7        dex = i / multiplicity;
8        leftCSize = maxL − (i % multiplicity);
9        rightCSize = context_sz − leftCSize;
10       mask = unsigned short int (pow(2,(SYMBOL_SZ *
             rightCSize)) − 1);
11       rightC = dex & mask;
12       leftC = dex >> (rightCSize * SYMBOL_SZ);
13   }
1    int nLevel::convert(unsigned char leftC, int leftCSize,
2              unsigned char rightC, int rightCSize)
3    {
4        unsigned short int dex;
5        int rShift;
6
7        rShift = (MAX_K − rightCSize) * SYMBOL_SZ;
8        dex = leftC << ((MAX_K * SYMBOL_SZ) − rShift);
9        dex |= rightC;
10       return (int(dex) * multiplicity) + (maxL − leftCSize);
11   }
```

A final function-member implementation for class "nLevel" is the function member "init," which initializes a level of nodes:

```
1 void nLevel::init(int m)
2 {
3        int left, right;
4
5        if (m == MAX_K * 2)
6        {
7            multiplicity = 1;
8            maxL = MAX_K;
9        }
10       else
11       {
12           left = MAX_K;
13           if (left > m) left = m;
14           maxL = left;
15           right = m − left;
16           multiplicity = 1;
17           while (left > 0 && right < MAX_K)
18           {
19               left−−;
20               right++;
21               multiplicity++;
22           }
23       }
24       context_sz = m;
25       sz = int(pow(2,(m * SYMBOL_SZ))) * multiplicity;
26   }
```

At the lowest level of nodes, where m=MAX_K*2, each node represents a maximally size left context and a maximally sized right context. Above the lowest level of nodes, nodes are stored as multiples in a level, the multiplicity representing the different numbers of pairs of context-portion lengths that sum to m. This allows for convenient initialization of the contexts within a level.

Next, implementations of function members of the class "CTree," which delete a tree or subtree of nodes and copy a tree or subtree of nodes, are provided:

```
1        void CTree::destroyTree(NODEPTR p)
2        {
3            int i;
4            NODEPTR n;
5
6            for (i = 0; i < ALPHABET_SZ; i++)
```

```
7          {
8              n = p->getPtr(i);
9              if (n != 0) destroyTree(n);
10         }
11         delete p;
12     }
1  NODEPTR CTree::copyTree(NODEPTR p)
2  {
3      NODEPTR n;
4      int i;
5
6      if (p == 0) return 0;
7      n = new node;
8      n->setCs(p->getLeftCSize( ), p->getLeftC( ),
           p->getRightCSize( ),
9                 p->getRightC( ));
10     for (i = 0; i < ALPHABET_SZ; i++)
           n->setPtr(copyTree(p->getPtr(i)), i);
11     return n;
12 }
```

The function member "split3way" for the class "CTree" determines, for a particular node, whether a right branch, left branch, or no branch operation should be conducted at that node:

```
1   split CTree::split3way(unsigned short int & w, unsigned
       char leftC,
2                          int leftCSize, unsigned char rightC,
                           int rightCSize)
3   {
4       int i, j;
5       unsigned char newLeftC;
6       unsigned char newRightC;
7       unsigned short int wr = 0, wl = 0;
8
9       if (leftCSize < MAX_K)
10      {
11          for (i = 0; i < ALPHABET_SZ; i++)
12          {
13              newLeftC = (leftC << SYMBOL_SZ) | (i &
                  sym_mask);
14              j = next->convert(newLeftC, leftCSize + 1,
                  rightC, rightCSize);
15              wl += next->getWeight(j);
16              nextLNodes[i] = j;
17              nextLData[i].setCs(leftCSize + 1, newLeftC,
                  rightCSize, rightC);
18          }
19      }
20      else wl = MAX_WEIGHT;
21      if (rightCSize < MAX_K)
22      {
23          for (i = 0; i < ALPHABET_SZ; i++)
24          {
25              newRightC = (rightC << SYMBOL_SZ) | (i &
                  sym_mask);
26              j = next->convert(leftC, leftCSize, newRightC,
                  rightCSize + 1);
27              wr += next->getWeight(j);
28              nextRNodes[i] = j;
29              nextRData[i].setCs(leftCSize, leftC, rightCSize + 1,
                  newRightC);
30          }
31      }
32      else wr = MAX_WEIGHT;
33      if (w < wr && w < wl) return LEAF;
34      if (wr < wl)
35      {
36          w = wr;
37          return BRANCH_R;
38      }
39      else
40      {
41          w = wl;
42              return BRANCH_L;
43      }
44  }
```

The function member "branch" of the class "CTree" carries out a right branch or left branch operation:

```
1   void CTree::branch(int i, split s, unsigned short int w, unsigned
       char leftC,
2                      int leftCSize, unsigned char rightC, int rightCSize)
3   {
4       int j;
5       int* nxt;
6       NODEPTR nxtd;
7       NODEPTR n, p;
8
9       if (s == BRANCH_R)
10      {
11          nxt = &(nextRNodes[0]);
12          nxtd = &(nextRData[0]);
13      }
14      else
15      {
16          nxt = &(nextLNodes[0]);
17          nxtd = &(nextLData[0]);
18      }
19      n = new(node);
20      n->setCs(leftCSize, leftC, rightCSize, rightC);
21      top->setNode(i, n);
22
23      for (j = 0; j < ALPHABET_SZ; j++)
24      {
25          p = next->getNode(*nxt);
26          if (p == 0)
27          {
28              p = new(node);
29              p->setCs(nxtd->getLeftCSize( ), nxtd->getLeftC( ),
30                  nxtd->getRightCSize( ), nxtd->getRightC( ));
31          }
32          else
33          {
34              next->incRef(*nxt);
35              if (next->getRef(*nxt) > 1) p = copyTree(p);
36          }
37          n->setPtr(p, j);
38          nxt++;
39          nxtd++;
40      }
41  }
```

The function member "cleanup" of the class "CTree" removes any unneeded subtrees following consideration of the nodes at a particular level:

```
1 void CTree::cleanup(int i)
2 {
3       NODEPTR p = next->getNode(i);
4
5       if (next->getRef(i) == 0 && p != 0) destroyTree(p);
6 }
```

The function member "switchLvl" of the class "CTree" switches between two instantiations of the class "nLevel" in order to prepare for construction of a next highest level of nodes. One of the instantiations is considered to be the current top level, and the other instantiation is considered to be the next level. Following consideration of each node in the current top level, the current top level becomes the next level, and a new level of nodes is constructed in the instantiation of the class "nLevel" formerly considered to be the next level, but, following the switch operation, currently considered to be the current top level:

```
1  void CTree::switchLvl( )
2  {
3      nLevel* tmp;
4
5      tmp = top;
6      top = next;
7      next = tmp;
8  }
```

Implementations for the function members "firstLevel" and "nextLevel" of the class "CTree" are next provided:

```
1  void CTree::firstLevel( )
2  {
3      int i;
4      int l, r;
5      unsigned char lt, rt;
6
7      top = &(lvls[0]);
8      next = &(lvls[1]);
9      m = MAX_K * 2;
10     next->init(m);
11     for (i = 0; i < next->getSize( ); i++)
12     {
13         next->convert(i, lt, l, rt, r);
14         next->setWeight(i, Weight(lt, l, rt, r));
15         next->setRef(i, 0);
16         next->setNode(i, 0);
17     }
18     m = m - 1;
19     top->init(m);
20     for (i = 0; i < top->getSize( ); i++)
21     {
22         top->convert(i, lt, l, rt, r);
23         top->setWeight(i, Weight(lt, l, rt, r));
24         top->setNode(i, 0);
25         top->setRef(i, 0);
26     }
27 }
1  bool CTree::nextLevel( )
2  {
3      int i;
4      int l, r;
5      unsigned char lt, rt;
6      unsigned short int w;
7      split sp;
8
9      m--;
10     if (m < -1) return false;
11     for (i = 0; i < top->getSize( ); i++)
12     {
13         top->convert(i, lt, l, rt, r);
14         w = top->getWeight(i);
15         sp = split3way(w, lt, l, rt, r);
16         if (sp != LEAF)
17         {
18             branch(i, sp, w, lt, l, rt, r);
19             top->setWeight(i, w);
20         }
21     }
22     for (i = 0; i < next->getSize( ); i++) cleanup(i);
23     if (m >= 0)
24     {
25         next->init(m);
26         for (i = 0; i < next->getSize( ); i++)
27         {
28             next->convert(i, lt, l, rt, r);
29             next->setWeight(i, Weight(lt, l, rt, r));
30             next->setNode(i, 0);
31             next->setRef(i, 0);
32         }
33         switchLvl( );
34     }
35     return true;
36 }
```

The function member "firstLevel" computes the lowest possible level of nodes of the bi-directional context tree, as shown in FIG. 24A, and is represented in the high-level pseudocode implementation as the first for-loop. The function "nextLevel" prepares and prunes each subsequent higher level of nodes within the bi-directional context tree, and represents the second for-loop in the high-level pseudocode implementation.

Finally, a constructor for the class "CTree" is provided:

```
1  CTree::CTree(WEIGHT wt)
2  {
3      Weight = wt;
4      sym_mask = int(pow(2, SYMBOL_SZ)) - 1;
5      firstLevel( );
6      while (nextLevel( ));
7      tree = top->getNode(0);
8      if (tree == 0) tree = new node;
9  }
```

The constructor takes a weighting function wt as an argument. It prepares the lowest possible level of nodes of a bi-directional context tree on line 5, by calling function member "firstLevel." Next, in the while-loop on line 6, each subsequent level of nodes is prepared via call to the function member "nextLevel," the preparation of each subsequent level followed by consideration of each node in the level in order to prune the tree according to the weighting function. The final optimal context tree is obtained as the tree emanating from the root node corresponding to context (Ø,Ø) on lines 7-8.

Estimation of the Effectiveness of a Denoiser for a specified Problem Domain

There are many different types of denoisers that may be applied to a particular denoising problem. As discussed above, an important class of denoising problems is denoising problems in which only a noisy signal is available. Evaluation of the effectiveness of a denoiser applied to a noisy signal cannot be computed based on comparing the signal restored by the denoiser and the original clean signal. One embodiment of the present invention provides a general technique for estimating the effectiveness of a denoiser in denoising a noisy signal, without access to the original, clean signal for comparison. This technique can be applied, as well, to estimate which of the many possible DUDE denoisers using different context sets is most effective for a particular problem, and the effectiveness estimator can be used to determine an optimal or near-optimal weighting function for optimal or near optimal bi-directional context tree construction, discussed in previous subsections.

For a context-based denoising application, an optimal or near-optimal context tree is provided by the multi-directional-tree-construction method only when an appropriate weighting function can be supplied. One approach is to use the denoiser-effectiveness estimation feature of the present invention to determine a weighting function. A DUDE-style denoiser generating the $i^{th}$ symbol of a denoised symbol sequence, $\hat{x}^*_i( )$, can be notationally represented as:

$$\hat{x}_i^*(z_i) = \frac{\min}{\hat{x} \in x} m(z^n, s_l^{(i)}, s_r^{(i)}) \Pi^{-1}(\lambda_{\hat{x}} \odot \pi_{z_i})$$

where $z_i$ is the $i^{th}$ symbol within the noisy sequence $z^n$ that corresponds to the clean sequence $x^n$;
$(s_l^{(i)}, r^{(i)})$ is the bidirectional context of the $i^{th}$ symbol
m is the count vector for the context $(s_l^{(i)}, s_r^{(i)})$; and
$\hat{x}$ is a possible replacement symbol for symbol $z_i$.
In terms of the replacement function g( ), discussed above, the denoiser can be described as:

$$g^*_{z^n,(s_l,s_r)}(z_i) = \frac{\min}{\hat{x} \in x} m(z^n, s_l, s_r) \Pi^{-1}(\lambda_{\hat{x}} \odot \pi_{z_i})$$

In a typical denoising application, the noisy symbol sequence $z^n$ is received through a noisy channel into which a corresponding clean symbol sequence $x^n$ is input:

$$x^n \xrightarrow[\text{noisy channel}]{} z^n$$

The clean signal is not available at the time of denoising:
$x^n$ not observable
Denoising of a sequence of symbols is carried out as a symbol-by-symbol replacement of noisy-signal symbols by replacement symbols:

$$\hat{x}_i(z_j, z_{j+1}, \ldots, z_m) \to \hat{x}_i(z_j), \hat{x}_i(z_{j+1}), \ldots \hat{x}_i(z_m)$$

Were the clean sequence $(x_j, x_{j+1}, \ldots, x_m)$ corresponding to the subsequence $(z_j, z_{j+1}, \ldots, z_m)$ observable, then the loss, or signal degradation, of the restored signal $\hat{x}_i(z_j, z_{j+1}, \ldots, z_m)$ for the subsequence $(z_j, z_{j+1}, \ldots, z_m)$ could be computed as:

$$L(x_j^m, z^n) = \sum_{i=j}^{m} \Lambda(x_i, \hat{x}_i(z_i))$$

However, because the clean symbol sequence $x^n$ is not observable, a denoising method may compute an estimated loss based on the received noisy signal $z^n$ as follows:

$$\text{estimated loss} = \hat{L}(z^n, j, m)$$
$$= \sum_{i=j}^{m} \sum_{x \in X} (\text{unbiased estimate of } \delta(x = x_i)) \text{ (average noise term)}$$
$$= \sum_{i=j}^{m} \sum_{x \in X} (\Pi^{-T}(x, z_i)) \left( \sum_{z \in X} \Lambda(x, \hat{x}_i(z)) \Pi(x, z) \right)$$

In other words, the estimated loss is the sum, over the symbols in the sequence $(z_j, z_{j+1} \ldots z_m)$, of the loss estimated for each symbol. The loss expected for each symbol $z_i$ is the sum, over all symbols in the alphabet X, of the product of an unbiased estimate of the $\delta(x=x_i)$ selection function and an average loss term, or average noise term, equal to the computed loss for replacing a random symbol z with a replacement symbol selected by the denoiser, $\hat{x}_i(z)$, given that the clean-signal symbol $x_i$ is equal to x. Note that the denoiser $\hat{x}_i(z_i)$ changes when a z different from $z_i$ replaces $z_i$, as discussed in greater detail below. Thus, the final above expression is obtained using the DUDE formalism described in the previous subsection. It turns out that the expected value of the actual loss, $L(x_j^m, z^n)$ is equal to the expected value of the estimated loss $\hat{L}(z^n, j, m)$:

$$E(L(x_j^m, z^n)) = E(\hat{L}(z^n, j, m))$$

For a weighting function used in the construction of bi-directional context trees, a cumulative estimated loss for an entire noisy signal, with the exception of the first and last k symbols of the noisy signal, can be minimized over all possible two-sided context sets of maximum context size 2k in order to identify an optimal context set for the denoising application:

$$\frac{\min}{\text{valid } S \subseteq X^{*k} x X^{*k}} \hat{L}(z^n, k+1, n-k)$$

where $X^{*k}$ represents all possible sequence strings of lengths from 0 up to and including k, and the minimization is over all valid bidirectional context sets S. Employing the previously discussed expression for estimated loss, the cumulative estimated loss is expressed as:

$$\hat{L}(z^n, k+1, n-k) =$$
$$\sum_{i=k+1}^{n-k} \sum_{x \in X} \Pi^{-T}(x, z_i) \sum_{z \in X} \Pi(x, z) \Lambda\left(x, g^*_{z_i^{i-1} z z_{i+1}^n, (s_l^{(i)}, s_r^{(i)})}(z)\right)$$

This cumulative estimated loss needs to be decomposed into a sum of context-based losses, or weights. All considered indices i within a noisy signal $z^n$ associated with context $(s_l, s_r)$ is represented as $I(s_l, s_r)$:

$$I(s_l, s_r) = \{i: k+l \leq i \leq n-k, (s_l^{(i)}, s_r^{(i)}) = (s_l, s_r)\}$$

Using this definition of $I(s_l, s_r)$, the cumulative estimated loss can be expressed as a sum of context weights as follows:

$$\hat{L}(z^n, k+1, n-k) = \sum_{(s_l, s_r) \in S} w(s_l, s_r)$$

$$w(s_l, s_r) =$$
$$\sum_{i \in I(s_l, s_r)} \sum_{x \in X} \Pi^{-T}(x, z_i) \sum_{z \in X} \Pi(x, z) \Lambda\left(x, g^*_{z_i^{i-1} z z_{i+1}^n, (s_l, s_r)}(z)\right)$$

The expression for the weight associated with a context $w(s_l, s_r)$ is summed over all occurrences of the context in the noisy signal, but includes an internal summation over all possible variations of the central symbol of the context. However, variations in the central symbol of the context may lead to differences in the count vector $m(z^n, s_l, s_r)$ used to estimate an equivalent count vector for the clean symbol sequence $x^n$. Moreover, when the occurrence of a particular context overlaps with another occurrence of a particular context within a noisy sequence, varying the central symbol of one context may alter the other, overlapping occurrence of the context to produce some other context. In other words, the expression for the weight associated with the context depends on central-symbol replacements that may lead to alteration of the values on which the computation is based. However, changes in the counts of the count vector $m(z^n, s_l, s_r)$ due to non-overlapping-context replacements can be easily accounted for, as described below, and overlapping contexts for contexts of meaningful sizes is sufficiently infrequent that overlapping contexts may be ignored, and a useful weight function nevertheless obtained. Accounting for changes in the count vectors, a final expression for the weight function $w(s_l, s_r)$ is obtained as:

$$w(s_l, s_r) = \sum_{\beta \in X} m(z^n, s_l, s_r)[\beta] \sum_{x \in X} \Pi^{-T}(x, \beta) \sum_{z \in X} \Pi(x, z) \Lambda\left(x, g_{z^n,(s_l,s_r)}^{z\backslash\beta}(z)\right),$$

where $g_{z^n,(sl,sr)}^{z\backslash\beta}(\cdot) = g_{z^n,(s_l,s_r)}^*(\cdot)$ but with $m(z^n, s_l, s_r)[\beta]$ replaced by $m(z^n, s_l, s_r)[\beta]-1$; and $m(z^n, s_l, s_r)[z]$ replaced by $m(z^n, s_l, s_r)[z]+1$.

The modified replacement function $g^{z\backslash\beta}$ uses a modified count vector $m(z^n, s_l, s_r)$ in which the count for the $z^{th}$ symbol is increased and the count of the $\beta^{th}$ it symbol is decreased for occurrences in the context $(s_l, s_r)$.

The denoiser-effectiveness estimation method that represents one embodiment of the present invention is generally applicable to all denoisers that replace symbols in a noisy signal with replacement symbols, regardless of their principles of operation. In an additional embodiment of the present invention, the effectiveness of a number of available denoisers can be evaluated for a particular problem domain, and the denoiser with the greatest estimated effectiveness can then be applied to the noisy signal to produce a restored signal. When the available denoisers include a generalized DUDE denoiser, the optimal or near optimal context-tree-construction method of the present invention, employing a weighting function with greatest estimated effectiveness, can be used to select the most specific effective DUDE denoiser.

Although the present invention has been described in terms of a particular embodiment, it is not intended that the invention be limited to this embodiment. Modifications within the spirit of the invention will be apparent to those skilled in the art. For example, an almost limitless number of different bi-directional contexts-tree construction routines can be implemented using different programming language, different modular organizations, different control structures, and other variations in the basic parameters that characterize program and logic implementations of methods and algorithms. Both the high-level pseudocode implementation and the C++-like pseudocode implementation compute lowest possible nodes for all possible maximum-length contexts, but for even modestly sized contexts based on modestly sized alphabets, the number of possible lowest-level nodes in a bi-directional context tree is staggering. Therefore, practical implementations construct only those lowest possible nodes corresponding to contexts actually observed in an ordered sequence of symbols. Many other implementation refinements may be used to deal with the commonly encountered issues involved in constructing and pruning large trees. While the above implementation is directed to bi-directional context trees, the implementations are straightforwardly extended to deal with multidirectional context trees for two-dimensional and higher-dimensional contexts. For example, an N-directional context may be represented as a tuple, $(s_1, s_2, s_3, \ldots, s_N)$, and the high-level pseudocode implementation, discussed above, can be modified to make an N-way branching decision, with each level of the process m involving all possible context-components lengths constrained by $m=|s_1|+|s_2|+\ldots+|s_N|$, with m ranging from Nk at the lowest level of the tree to 0. Ultimately, contexts of any dimensionality can be mapped to multidirectional contexts in which subsequences, or intervals, of symbols are ignored. Many different possible estimated loss expressions may be used to generate node and subtree weighting functions, in addition to the particular cumulative estimated loss functions discussed above.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalent.

The invention claimed is:

1. A method for estimating the effectiveness of a denoiser for denoising a noisy symbol sequence z received following transmission of a clean symbol sequence x through a noisy channel, the method comprising:
   computing, for each symbol $z_i$, in the noisy symbol sequence, an estimated loss resulting from replacing the symbol $z_i$, with a replacement symbol computed by the denoiser; and
   adding together the estimated losses computed for each symbol $z_i$ to produce an estimated loss resulting from denoising the noisy sequence z by the denoiser.

2. The method of claim 1 wherein computing, for each symbol $z_i$, in the noisy symbol sequence, an estimated loss for replacing the symbol $z_i$, with a replacement symbol computed by the denoiser further includes:
   for each symbol x in an alphabet X from which symbols of the symbol sequences are chosen,
      computing an unbiased estimate of a selection function $\delta(x_i=x)$ where x is a symbol in the alphabet X and $x_i$, is the clean symbol sequence symbol corresponding to the symbol $z_i$,
      computing an average loss term equal to the computed loss for replacing a random symbol z with a replacement symbol selected by the denoiser, given that the clean signal symbol $x_i$, is equal to x, and
      multiplying the estimate of a selection function $\delta(x_i=x)$ by the computed average loss term to compute an estimated loss for the symbol x; and summing together the estimated losses computed for each symbol x.

3. The method of claim 1 used to determine a context set for a context-based denoiser to apply to the noisy sequence z by selecting a context set that produces a minimal estimated loss for denoising the noisy sequence z.

4. Computer instructions encoded and stored in a non-transitory computer readable medium that implement the method of claim 1 for estimating the effectiveness of a denoiser for denoising a noisy symbol sequence z received following transmission of a clean symbol sequence x through a noisy channel, the method comprising:
- computing, for each symbol $z_i$ in the noisy symbol sequence, an estimated loss resulting from replacing the symbol $z_i$ with a replacement symbol computed by the denoiser; and
- adding together the estimated losses computed for each symbol $z_i$ to produce an estimated loss resulting from denoising the noisy sequence z by the denoiser.

5. A method for selecting a denoiser to apply to a noisy symbol sequence z received following transmission of a clean symbol sequence x through a noisy channel, the method comprising:
- for each denoiser,
  - estimating the effectiveness of the denoiser for denoising a noisy symbol sequence z received following transmission of a clean symbol sequence x through a noisy channel by
  - computing, for each symbol $z_i$ in the noisy symbol sequence, an estimated loss resulting from replacing the symbol $z_i$ with a replacement symbol computed by the denoiser, and
  - adding together the estimated losses computed for each symbol $z_i$ to compute an estimated loss resulting from denoising the noisy sequence z by the denoiser; and
- selecting the denoiser with a smallest computed estimated loss.

6. Computer instructions encoded and stored in a non-transitory computer readable medium that implement the method of claim 5 for selecting a denoiser to apply to a noisy symbol sequence z received following transmission of a clean symbol sequence x through a noisy channel, the method comprising:
- for each denoiser,
  - estimating the effectiveness of the denoiser for denoising a noisy symbol sequence z received following transmission of a clean symbol sequence x through a noisy channel by
  - computing, for each symbol $z_i$, in the noisy symbol sequence, an estimated loss resulting from replacing the symbol $z_i$, with a replacement symbol computed by the denoiser, and
  - adding together the estimated losses computed for each symbol $z_i$, to compute an estimated loss resulting from denoising the noisy sequence z by the denoiser; and
- selecting the denoiser with a smallest computed estimated loss.

7. A system that selects a denoiser to apply to a noisy symbol sequence z received following transmission of a clean symbol sequence x through a noisy channel, the system comprising:
- logic that computes, for each symbol $z_i$, in the noisy symbol sequence, an estimated loss resulting from replacing the symbol $z_i$, with a replacement symbol computed by a particular denoiser;
- logic that adds together the estimated losses computed for each symbol $z_i$, for a particular denoiser to compute an estimated loss resulting from denoising the noisy sequence z by the particular denoiser; and
- logic that selects as the denoiser to apply to the noisy symbol sequence the denoiser with the lowest computed estimated loss.

8. The system of claim 7 wherein the logic that computes, for each symbol $z_i$, in the noisy symbol sequence, an estimated loss for replacing the symbol $z_i$, with a replacement symbol computed by the denoiser computes the estimated loss by:
- for each symbol x in an alphabet X from which symbols of the symbol sequences are chosen,
  - computing an unbiased estimate of a selection function $\delta(x_i=x)$ where x is a symbol in the alphabet X and $x_i$, is the clean symbol sequence symbol corresponding to the symbol $z_i$,
  - computing an average loss term equal to the computed loss for replacing a random symbol z with a replacement symbol selected by the denoiser, given that the clean-signal symbol $x_i$, is equal to x, and
  - multiplying the estimate of a selection function $\delta(x_i=x)$ by the computed average loss term to compute an estimated loss for the symbol x; and
- summing together the estimated losses computed for each symbol x.

* * * * *

UNITED STATES PATENT AND TRADEMARK OFFICE
CERTIFICATE OF CORRECTION

PATENT NO. : 8,085,888 B2
APPLICATION NO. : 11/580453
DATED : December 27, 2011
INVENTOR(S) : Erik Ordentlich et al.

Page 1 of 1

It is certified that error appears in the above-identified patent and that said Letters Patent is hereby corrected as shown below:

In the Claims:

In column 30, line 44, in Claim 1, delete "$z_i$," and insert -- $z_i$ --, therefor.

In column 30, line 46, in Claim 1, delete "$z_i$," and insert -- $z_i$ --, therefor.

In column 30, line 52, in Claim 2, delete "$z_i$," and insert -- $z_i$ --, therefor.

In column 30, line 53, in Claim 2, delete "$z_i$," and insert -- $z_i$ --, therefor.

In column 30, line 58, in Claim 2, delete "$x_i$," and insert -- $x_i$ --, therefor.

In column 30, line 64, in Claim 2, delete "$x_i$," and insert -- $x_i$ --, therefor.

In column 31, line 34, in Claim 5, delete "z;" and insert -- $z_i$ --, therefor.

In column 32, line 1, in Claim 6, delete "$z_i$," and insert -- $z_i$ --, therefor.

In column 32, line 3, in Claim 6, delete "$z_i$," and insert -- $z_i$ --, therefor.

In column 32, line 6, in Claim 6, delete "$z_i$," and insert -- $z_i$ --, therefor.

In column 32, line 15, in Claim 7, delete "$z_i$," and insert -- $z_i$ --, therefor.

In column 32, line 17, in Claim 7, delete "$z_i$," and insert -- $z_i$ --, therefor.

In column 32, line 20, in Claim 7, delete "$z_i$," and insert -- $z_i$ --, therefor.

In column 32, line 27, in Claim 8, delete "$z_i$," and insert -- $z_i$ --, therefor.

In column 32, line 28, in Claim 8, delete "$z_i$," and insert -- $z_i$ --, therefor.

In column 32, line 34, in Claim 8, delete "$x_i$," and insert -- $x_i$ --, therefor.

In column 32, line 40, in Claim 8, delete "$x_i$," and insert -- $x_i$ --, therefor.

Signed and Sealed this
Seventeenth Day of September, 2013

Teresa Stanek Rea
*Deputy Director of the United States Patent and Trademark Office*